(12) United States Patent
Lee

(10) Patent No.: US 9,176,744 B2
(45) Date of Patent: Nov. 3, 2015

(54) QUICKLY PROVISIONING A VIRTUAL MACHINE BY IDENTIFYING A PATH TO A DIFFERENTIAL FILE DURING PRE-BOOT

(75) Inventor: Moso Lee, Nashua, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 204 days.

(21) Appl. No.: 13/475,200

(22) Filed: May 18, 2012

(65) Prior Publication Data
US 2012/0297181 A1 Nov. 22, 2012

Related U.S. Application Data

(60) Provisional application No. 61/488,606, filed on May 20, 2011.

(51) Int. Cl.
G06F 9/44 (2006.01)
G06F 9/445 (2006.01)
G06F 9/455 (2006.01)

(52) U.S. Cl.
CPC ............... *G06F 9/4401* (2013.01); *G06F 8/68* (2013.01); *G06F 8/63* (2013.01); *G06F 9/4416* (2013.01); *G06F 2009/45575* (2013.01)

(58) Field of Classification Search
CPC ......... G06F 8/00; G06F 9/455; G06F 9/4403; G06F 12/0246; G06F 15/177; G06F 9/45533; G06F 11/1484; G06F 9/4856; G06F 9/4401
USPC ........................................................ 713/1, 2
See application file for complete search history.

(56) References Cited

U.S. PATENT DOCUMENTS

| | | | |
|---|---|---|---|
| 6,912,707 B1 * | 6/2005 | Fontes, Jr. ..................... | 717/113 |
| 7,356,679 B1 * | 4/2008 | Le et al. ............................ | 713/1 |
| 7,421,460 B2 * | 9/2008 | Chigusa et al. ...................... | 1/1 |
| 7,461,373 B2 * | 12/2008 | Herle et al. .................... | 717/171 |
| 7,549,055 B2 * | 6/2009 | Zimmer et al. ................ | 713/188 |
| 8,041,967 B2 * | 10/2011 | Belady et al. ................. | 713/320 |
| 8,145,940 B1 * | 3/2012 | Wang et al. .................... | 714/6.1 |
| 8,209,680 B1 * | 6/2012 | Le et al. ........................ | 717/174 |
| 8,301,874 B1 * | 10/2012 | Heidingsfeld et al. ............ | 713/2 |
| 8,364,974 B2 * | 1/2013 | Zimmer et al. ................ | 713/188 |
| 8,365,167 B2 * | 1/2013 | Beaty et al. ........................ | 718/1 |
| 8,468,535 B1 * | 6/2013 | Keagy et al. .................. | 718/104 |
| 8,473,588 B2 * | 6/2013 | Peterson et al. .............. | 709/222 |
| 8,640,126 B2 * | 1/2014 | Halperin et al. .................. | 718/1 |

(Continued)

OTHER PUBLICATIONS

The System Boot Process Explained, Sep. 1, 2010, Webopedia, p. 1-2.*

*Primary Examiner* — Thomas Lee
*Assistant Examiner* — Santosh R Poudel
(74) *Attorney, Agent, or Firm* — Banner & Witcoff, Ltd.

(57) ABSTRACT

Systems and methods are provided for implementing a provisioned machine that persists across a client machine reboot. For example, a bootstrap function executing on a client machine may identify a delta disk stored on a physical disk of the client machine prior to booting up the operating system of the client machine. The bootstrap function may establish the path to the delta disk during the boot up of the operating system of the client machine. A provisioned machine may then be established based on the delta disk and the remote base disk to form a virtual disk of the operating system. Subsequently, the client machine may shut down, reboot and re-establish the provisioned machine based on the delta disk stored locally on the client machine.

17 Claims, 18 Drawing Sheets

(56) References Cited

U.S. PATENT DOCUMENTS

| | | | |
|---|---|---|---|
| 2004/0062130 A1* | 4/2004 | Chiang | 365/230.03 |
| 2004/0098427 A1* | 5/2004 | Peng | 707/205 |
| 2006/0123056 A1* | 6/2006 | Darbha et al. | 707/104.1 |
| 2006/0230175 A1* | 10/2006 | de Vries | 709/231 |
| 2007/0288533 A1* | 12/2007 | Srivastava et al. | 707/203 |
| 2008/0034364 A1* | 2/2008 | Lam et al. | 718/1 |
| 2008/0040401 A1* | 2/2008 | Reinsch | 707/203 |
| 2008/0082816 A1* | 4/2008 | Lam | 713/2 |
| 2009/0094603 A1* | 4/2009 | Hiltgen et al. | 718/1 |
| 2009/0254641 A1* | 10/2009 | Liu et al. | 709/222 |
| 2009/0260007 A1* | 10/2009 | Beaty et al. | 718/1 |
| 2009/0292737 A1* | 11/2009 | Hayton | 707/200 |
| 2010/0107113 A1* | 4/2010 | Innes et al. | 715/779 |
| 2010/0205421 A1* | 8/2010 | Campbell et al. | 713/2 |
| 2010/0235615 A1* | 9/2010 | Manczak et al. | 713/2 |
| 2010/0299312 A1* | 11/2010 | Suryanarayanan et al. | 707/645 |
| 2010/0299368 A1* | 11/2010 | Hutchins et al. | 707/803 |
| 2010/0306770 A1* | 12/2010 | Frank | 718/1 |
| 2010/0325381 A1* | 12/2010 | Heim | 711/170 |
| 2011/0138383 A1* | 6/2011 | Le | 718/1 |
| 2011/0225578 A1* | 9/2011 | Lauwers et al. | 717/176 |
| 2011/0238969 A1* | 9/2011 | Warkentin et al. | 713/2 |
| 2011/0246719 A1* | 10/2011 | Knox et al. | 711/118 |
| 2011/0265076 A1* | 10/2011 | Thorat et al. | 717/172 |
| 2012/0054742 A1* | 3/2012 | Eremenko et al. | 718/1 |
| 2012/0060004 A1* | 3/2012 | Rope et al. | 711/154 |
| 2012/0060153 A1* | 3/2012 | Bealkowski | 718/1 |
| 2012/0131323 A1* | 5/2012 | Gattegno et al. | 713/2 |
| 2012/0144060 A1* | 6/2012 | Russo et al. | 709/234 |
| 2015/0178108 A1* | 6/2015 | Tarasuk-Levin et al. | 718/1 |

* cited by examiner

QUICKLY PROVISIONING A VIRTUAL MACHINE BY IDENTIFYING A PATH TO A DIFFERENTIAL FILE DURING PRE-BOOT

CROSS-REFERENCE TO RELATED APPLICATION

This application claims the priority benefit of U.S. patent application Ser. No. 61/488,606, a provisional patent application filed on May 20, 2011, and entitled "Methods and Systems for Persisting a Provisioned Machine on a Client across Client Machine Reboot," the disclosure of which is incorporated by reference herein for all purposes.

FIELD

This disclosure generally relates to computer networks and remote computing, including environments in which a plurality of disk images may be updated. More specifically, aspects described herein relate to implementing a provisioned machine on a client machine.

BACKGROUND

In an environment for centralized management of desktops, multiple client machines may receive access to or execute a computing environment based on copies of a single "golden master" desktop disk image. A machine disk image or desktop disk image may be an image of an operating system (OS), and may include sets of applications and customizations representing a working environment for a user. In some environments, a machine image includes files used to execute a virtual machine (VM) that then executes an operating system or other user applications. In other environments, a desktop image includes files used to execute an operating system or other user application, and either a physical machine or a virtual machine may execute the desktop image. An image of a machine or desktop may be generally referred to as a base disk image.

One aspect of desktop administration is the need to apply changes to either the operating system or to installed applications within the desktop environment (e.g., to perform upgrades or other maintenance). Users on remote clients may create, in effect, their own independent machine image. For example, a change requested by a user to a base disk image is stored in a delta file associated with that user. The combination of the base disk image and one or more delta files associated with that user is referred to as the user's machine disk image. In another example, machine disk images are patched individually. This may be expensive in terms of time taken, as typically each machine is booted, patched and then shut down and re-started. Additionally, this may be expensive in terms of disk usage, as patching will lead to changes in the individual delta files, rather than to changes in the common base disk image. In these examples, changes due to a patch are typically applied to the delta files rather than the base disk image, thus ballooning the size of the delta images and increasing storage requirements for the delta files.

SUMMARY

In brief overview, the systems and methods described herein relate to implementing a provisioned machine on a client and persisting such a provisioned machine on the client across client machine reboots. In addition, the systems and methods discussed herein enable the virtual disk from which the provisioned machine operates to load the data or information from the base disk of the server until the virtual disk includes all the data enabling the client to independently operate from the local virtual disk in an offline fashion. Furthermore, methods and systems are discussed herein for updating, in a virtual machine environment, a plurality of disk images, each of the plurality of disk images comprising a delta disk image derived from a common base disk image, with a common set of modifications.

In typical provisioned machines, multiple devices may use the same base disk for operation. Accordingly, a delta disk for each provisioned machine may reside on the provisioned machine's physical disk. However, these delta disks are unable to persist on the client machine across reboot.

The present disclosure enables a virtual disk difference, such as a delta disk, to persist on a client machine across reboot by enabling, during the preboot phase, a provisioning bootstrap function to read the virtual hard disk (VHD) differencing disk as a file located on a new technology file system (NTFS) of the physical disk. The bootstrap function may run in real-mode with limited system resource and may implement VHD and NTFS stacks in the real-mode environment.

During the boot up of the operating system, the virtual disk storage controller may allow the physical disk controller to initialize the physical disk first so that the delta disk path chain may be established during boot time. This functionality may allow the provisioned operating system to read from and write to the virtual disk with previously created disk delta.

During the operation of the provisioned machine, the delta disk may be expanded and populated with data that is present on the base disk of the remote server but not present on the delta disk. As the delta disk is synchronized, the delta disk may eventually become a copy of the base disk of the server. Once the delta disk includes all of the data from the base disk, or at least the essential data allowing the uninterrupted operation of the provisioned machine functions from the delta disk, the delta disk may be capable of operating offline.

During the shutdown of the operating system, the operating system may shut down the virtual disk before the physical disk. The delta disk may thus be enabled to persist on the client machine across the reboot and the provisioned machine may provide enough information to the operating system to acknowledge the presence of the virtual disk.

This summary is not intended to identify critical or essential features of the disclosures herein, but instead merely summarizes certain features and variations thereof. The details of various embodiments of the methods and systems described herein are set forth in the accompanying drawings and the description below.

BRIEF DESCRIPTION OF THE DRAWINGS

The following figures depict certain illustrative embodiments of the methods and systems described herein, in which like reference numerals refer to similar elements. These depicted embodiments are to be understood as illustrative of the disclosed methods and systems by way of example and not by way of limitation.

DETAILED DESCRIPTION

For purposes of reading the description of the various embodiments below, the following descriptions of the sections of the specification and their respective contents may be helpful:

Section A describes a non-limiting illustrative network environment and computing environment which may be useful for practicing embodiments described herein;

Section B describes non-limiting illustrative embodiments of a booting system for providing various features of the embodiments described herein; and Section C describes non-limiting illustrative embodiments of systems and methods for implementing a provisioned virtual machine on a client.

Section A: Network and Computing Environment

Figure 1A:
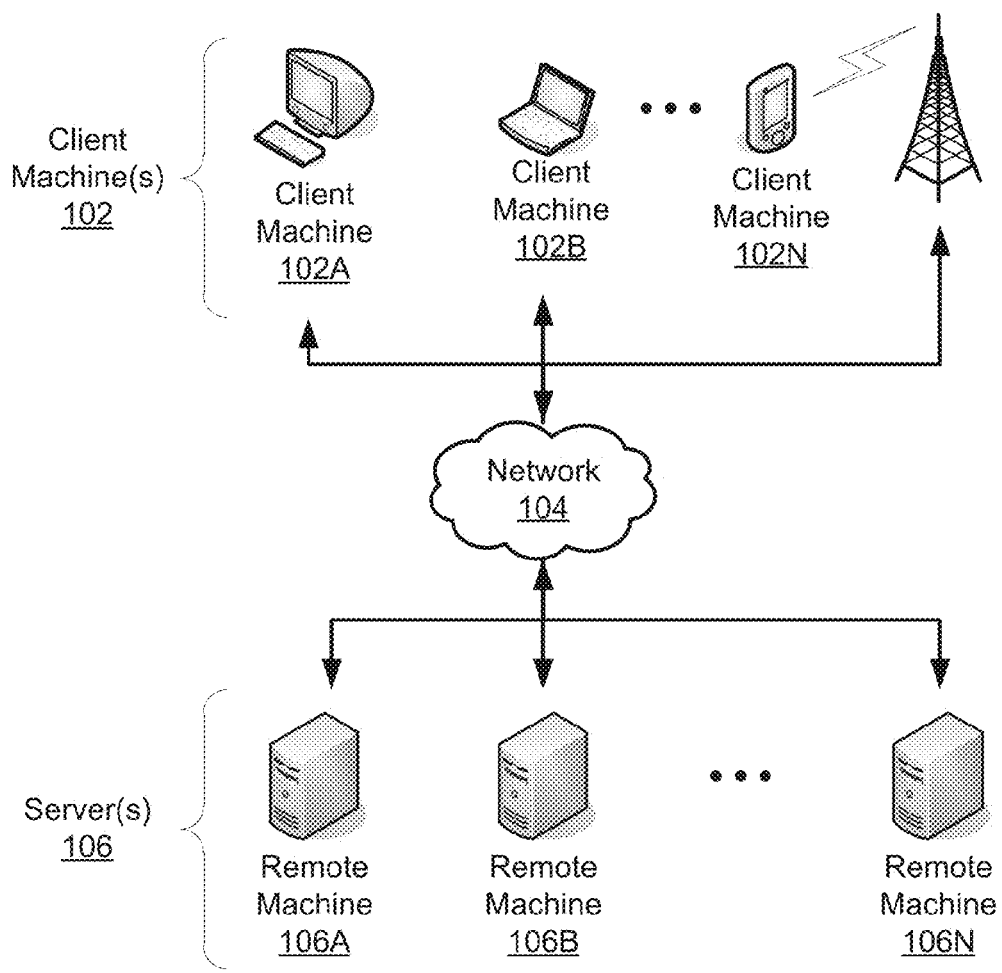
FIG. 1A illustrates an embodiment of a network environment that provides remote access to computing devices that may execute application programs.

FIG. 1A illustrates one embodiment of a computing environment 101 that includes one or more client machines 102A-102N in communication with one or more remote machines 106A-106N via one or more networks 104. One or more client machines 102A-102N may be generally referred to herein as client machine(s) 102, local machine(s) 102, client(s) 102, client node(s) 102, client computer(s) 102, client device(s) 102, endpoint(s) 102, or endpoint node(s) 102. One or more remote machines 106A-106N may be generally referred to herein as server(s) 106 or server farm 106. In some embodiments, a client machine 102 may have the capacity to function as both a client node seeking access to resources provided by a server 106 and as a server 106 providing access to hosted resources for other client machines 102A-102N.

In one embodiment, the client machine 102 may be a virtual machine. The virtual machine may be managed by, for example, a hypervisor, a virtual machine manager (VMM), or any other hardware virtualization technique.

In some embodiments, the client machine 102 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 may display the application output in an application window, a browser, or other output window. In one embodiment, the application may be a desktop, while in other embodiments the application may be an application that generates a desktop.

In some embodiments, a server 106 may execute a remote presentation client or other client or program that uses a thin-client or remote-display protocol to capture display output generated by an application executing on a server 106 and transmits the application display output to a remote client 102.

In some embodiments, the computing environment may include more than one remote machine 106A-106N logically grouped together into a server farm 106. The server farm 106 may include servers 106 that are geographically dispersed and logically grouped together in a server farm 106, or servers 106 that are located proximate to each other and logically grouped together. The logical group of remote machines 106A-106N may be referred to as a server farm 106. In some instances, the remote machines 106A-N of each server farm 106 may be geographically dispersed. Geographically dispersed servers 106A-106N within a server farm 106 may, in some embodiments, communicate using a wide area network (WAN), a metropolitan area network (MAN), or a local area network (LAN), where different geographic regions may be characterized as: different continents; different regions of a continent; different countries; different states; different cities; different campuses; different rooms; or any combination of geographical locations. In some embodiments the server farm 106 may be administered as a single entity, while in other embodiments the server farm 106 may include multiple server farms 106.

In some embodiments, a server farm 106 may include servers 106 that execute a substantially similar type of operating system platform. In other embodiments, the remote machines 106 within each server farm 106 may be heterogeneous. For example, the server farm 106 may include a first group of servers 106 that execute a first type of operating system platform, and a second group of servers 106 that execute a second type of operating system platform. The server farm 106, in other embodiments, may include servers 106 that execute different types of operating system platforms.

A remote machine 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In still other embodiments, a remote machine 106 is a blade server. In yet other embodiments, a remote machine 106 executes a virtual machine providing, to a user or client computer 102, access to a computing environment.

Some embodiments include a first server 106A that receives requests from a client machine 102, forwards the requests to a second server 106B, and responds to the requests generated by the client machine 102 with a response from the second server 106B. The first server 106A may acquire an enumeration of applications available to the client machine 102 and as well as address information associated with an application server 106 hosting an application identified within the enumeration of applications. The first server 106A may then present a response to the client's request using a web interface, and communicate directly with the client 102 to provide the client 102 with access to an identified application.

The remote machine 106 or server farm 106 may, in some embodiments, execute any one of the following applications: a thin-client application using a thin-client protocol to transmit application display data to a client; or a remote display presentation application. Another embodiment includes a server 106 that is an application server such as: an email server that provides email services; a web or Internet server; a desktop sharing server; a collaboration server; or any other type of application server. Still other embodiments include a server 106 that executes a hosted server application, such as a remote meeting or desktop sharing application.

In some embodiments, a remote machine 106 may execute an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

A client machine 102 may be, for example, a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node may identify and provide address information associated with a server 106 hosting a requested application, to one or more clients 102 or servers 106. In still other embodiments, the master node may be a server farm 106, a client 102, a cluster of client nodes 102, or an appliance.

In some embodiments, a client 102 may communicate directly with one of the remote machines 106 in a server farm 106. In another embodiment, the client 102 executes a program neighborhood application to communicate with a remote machine 106 in a server farm 106. In still another embodiment, the remote machine 106 provides the functionality of a master node. In some embodiments, the client 102 communicates with the remote machine 106 in the server farm 106 through a network 104. Over the network 104, the client 102 may, for example, request execution of various applications hosted by the remote machines 106A-106N in the server farm 106 and receive output of the results of the application execution for display. In some embodiments, only the master node provides the functionality required to identify and provide address information associated with a remote machine 106B hosting a requested application.

In one embodiment, the remote machine 106 provides the functionality of a web server. In another embodiment, the remote machine 106a receives requests from the client 102, forwards the requests to a second remote machine 106b and responds to the request by the client 102 with a response to the request from the remote machine 106b. In still another embodiment, the remote machine 106a acquires an enumeration of applications available to the client 102 and address information associated with a remote machine 106b hosting an application identified by the enumeration of applications. In yet another embodiment, the remote machine 106 presents the response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

One or more client machines 102, one or more servers 106, or both may transmit data over one or more networks 104 installed between machines and appliances within the computing environment 101. The network 104 may comprise one or more sub-networks, and may be installed between any combination of the clients 102, servers 106, computing machines and appliances included within the computing environment 101. In some embodiments, the network 104 may be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that may be any of the following network types: a point to point network; a broadcast network; a telecommunications network; a data communication network; a computer network; an Asynchronous Transfer Mode (ATM) network; a Synchronous Optical Network (SONET) network; a Synchronous Digital Hierarchy (SDH) network; a wireless network; a wireline network; or a network 104 that includes a wireless link where the wireless link may be an infrared channel or satellite band. The network topology of the network 104 may differ within different embodiments. Possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol may be any one of the following: Advanced Mobile Phone System (AMPS); Time Division Multiple Access (TDMA); Code Division Multiple Access (CDMA); Global System for Mobile Communications (GSM); General Packet Radio Service (GPRS); Universal Mobile Telecommunications System (UMTS); Evolution-Data Optimized (EV-DO); Long Term Evolution (LTE); or any other protocol able to transmit data among mobile devices like 802.11, Bluetooth, and Near Field Communication.

Although FIG. 1A shows a network 104 between the client machines 102 and remote machines 106, there may be multiple networks 104 between the clients 102 and the remote machines 106. In one of these embodiments, a network 104' may be a private network and a network 104 may be a public network. In another of these embodiments, a network 104 may be a private network and a network 104' a public network. In still another embodiment, networks 104 and 104' may both be private networks. Additional networks, such as network 104', are not shown in FIG. 1A to avoid overcomplicating the drawing.

Figure 1B:
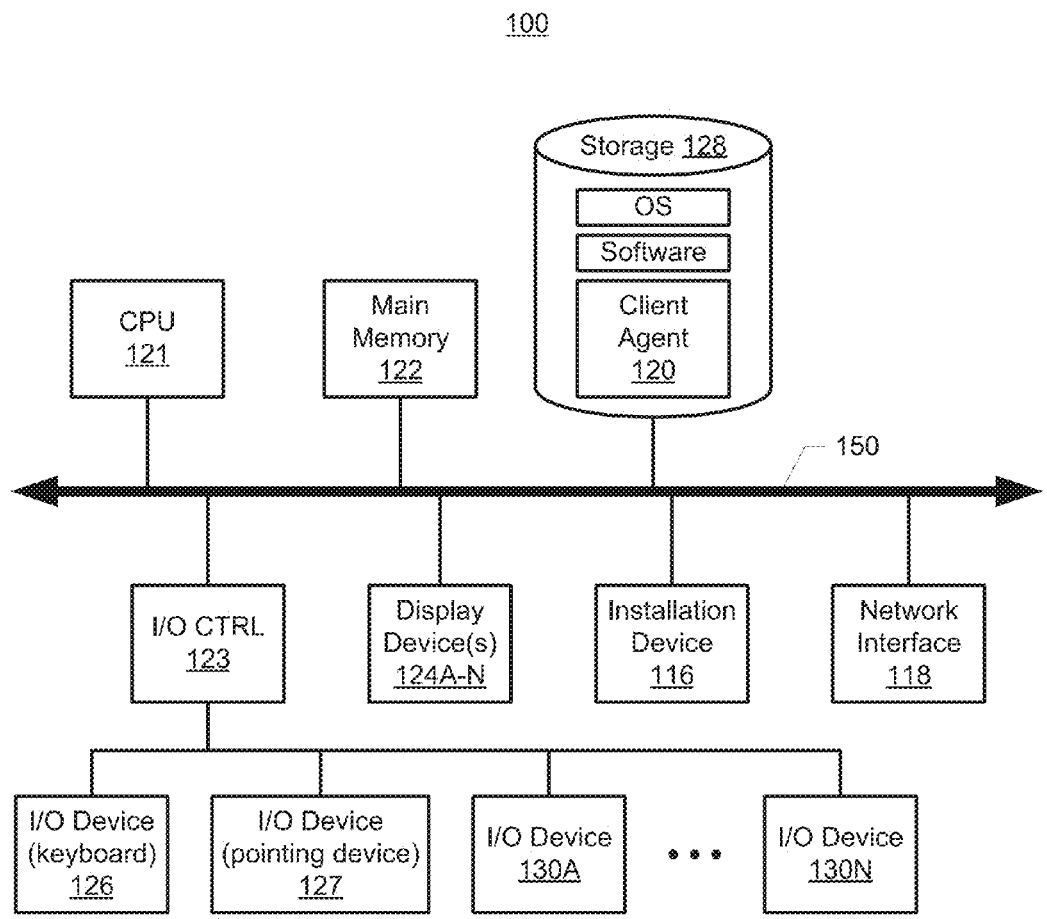
FIG. 1B and FIG. 1C illustrate block diagrams that depict embodiments of computing devices.
Figure 1C:
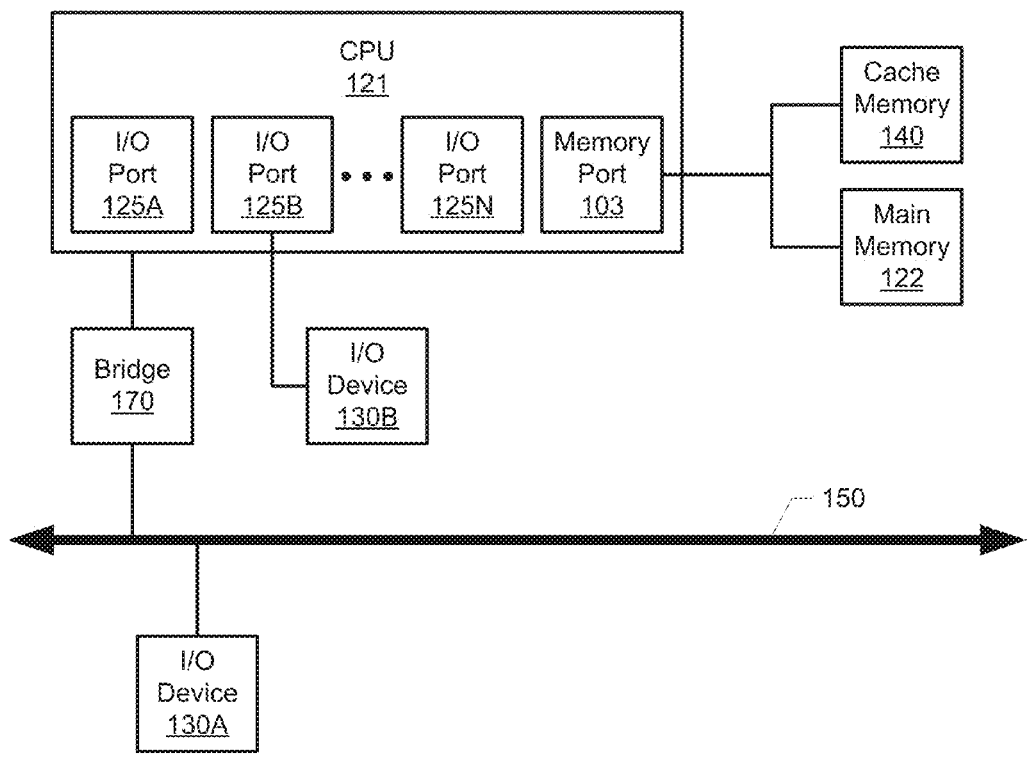

FIG. 1B and FIG. 1C depict block diagrams of a computing device 100 useful for practicing an embodiment of the client 102 or a remote machine 106. As shown in FIG. 1B and FIG. 1C, each computing device 100 includes a central processing unit 121, and a main memory unit 122. FIG. 1B depicts an embodiment of a computing device 100 in which the processor 121 communicates with main memory 122 via a system bus 150. FIG. 1C depicts an embodiment of a computing device 100 in which the processor 121 communicates directly with main memory 122 and cache memory 140 via a memory port 103.

FIG. 1B illustrates an embodiment of a computing device 100, where the client machine 102 and server 106 illustrated in FIG. 1A may be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a keyboard 126, and a pointing device 127. Other embodiments may include an I/O controller 123 connected to more than one input/output device 130A-130N.

FIG. 1C illustrates another embodiment of a computing device 100, where the client machine 102 and server 106 illustrated in FIG. 1A may be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 may further communicate with a second I/O device 130B, a main memory 122, and a cache memory 140. Included within the central processing unit 121, are I/O ports 125A-N, a memory port 103, and a main processor 121.

Embodiments of the computing machine 100 may include a central processing unit 121 characterized by any one of the following component configurations: logic circuits that respond to and process instructions fetched from the main memory unit 122; a microprocessor unit, a microprocessor, a microcontroller, a central processing unit with a single processing core, a central processing unit with two processing cores, a central processing unit with more than one processing core, a programmable logic device, or any other suitable combination of logical circuits.

While FIG. 1C illustrates a computing device 100 that includes a single central processing unit 121, in some embodiments the computing device 100 may include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 may include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 may be segmented and assigned to a particular core within the processing unit 121. In one embodiment, the one or more processing cores or processors in the computing device 100 may each access local memory. In still another embodiment, memory within the computing device 100 may be shared amongst one or more processors or processing cores, while other memory may be accessed by particular processors or subsets of processors. In embodiments where the computing device 100 includes more than one processing unit, the multiple processing units may be included in a single integrated circuit (IC). These multiple processors, in some embodiments, may be linked together by an internal high speed bus, which may be referred to as an element interconnect bus.

In embodiments where the computing device 100 includes one or more processing units 121, or a processing unit 121 including one or more processing cores, the processors may execute a single instruction simultaneously on multiple pieces of data (SIMD), or in other embodiments may execute multiple instructions simultaneously on multiple pieces of data (MIMD). In some embodiments, the computing device 100 may include any number of SIMD and MIMD processors.

The computing device 100, in some embodiments, may include a graphics processor or a graphics-processing unit. The graphics processing unit may include any combination of software and hardware, and may further input graphics data and graphics instructions, render a graphic from the inputted data and instructions, and output the rendered graphic. In some embodiments, the graphics processing unit may be included within the processing unit 121. In other embodiments, the computing device 100 may include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 may, in some embodiments, also be used by the central processing unit to communicate with more than one type of I/O device 130A-130N. In some embodiments, the local system bus 150 may be any one of the following types of buses: a Video Electronics Standards Association Local (VL) bus; an Industry Standard Architecture (ISA) bus; an Extended ISA (EISA) bus; a MicroChannel Architecture (MCA) bus; a Peripheral Component Interconnect (PCI) bus; a PCI-Extended (PCI-X) bus; a PCI-Express (PCIe) bus; or an Accelerated Graphics Port (AGP) bus. Other embodiments of the computing machine 100 include an I/O device 130A-130N that is a video display 124 that communicates with the central processing unit 121. Still other versions of the computing machine 100 include a processor 121 connected to an I/O device 130A-130N via any suitable connection, such as: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 and main memory unit 122 may, in some embodiments, be any one of the following types of memory: Static Random Access Memory (SRAM), Burst SRAM or SynchBurst SRAM (BSRAM); Dynamic Random Access Memory (DRAM); Fast Page Mode DRAM (FPM DRAM); Enhanced DRAM (EDRAM), Extended Data Output RAM (EDO RAM); Extended Data Output DRAM (EDO DRAM); Burst EDO DRAM (BEDO DRAM); synchronous DRAM (SDRAM); Joint Electron Devices Engineering Council (JEDEC) SRAM; PC100 SDRAM; Double Data Rate SDRAM (DDR SDRAM); Enhanced SDRAM (ESDRAM); SyncLink DRAM (SLDRAIVI); Ferroelectric RAM (FRAM); memristor based memory; or any other type of memory. Further embodiments include a central processing unit 121 that may access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, a universal serial bus (USB) device, Secure Digital card, Preboot Execution Environment (PXE) firmware, a bootable medium, a bootable CD, a harddrive or any other device suitable for installing applications or software. Applications may, in some embodiments, include a client agent 120, or any portion of a client agent 120. The computing device 100 may further include a storage device 128 that may be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a LAN, WAN or the Internet through a variety of connections including, but not limited to, standard telephone lines, LAN or WAN links (e.g., 802.11, T1, T3, 56 kb, X.25), broadband connections (e.g., Integrated Services Digital Network (ISDN), Frame Relay, ATM, Gigabit Ethernet, Ethernet-over-SONET), wireless connections, or some combination of any or all of the above. Connections may also be established using a variety of communication protocols (e.g., TCP/IP, Ethernet, Attached Resource Computer Network (ARCNET), SONET, SDH, Fiber Distributed Data Interface (FDDI), RS232, RS485, IEEE 802.11, IEEE 802.11a/b/g/n, CDMA, GSM, Wi-Fi, WiMax and direct asynchronous connections). One version of the computing device 100 includes a network interface 118 able to communicate with additional computing devices via any type and/or form of gateway or tunneling protocol such as Secure Socket Layer (SSL) or Transport Layer Security (TLS). Versions of the network interface 118 may comprise any one of: a built-in network adapter; a network interface card; a Personal Computer Memory Card International Association (PCMCIA) network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may, in some embodiments, connect to multiple I/O devices 103A-130N to control the one or more I/O devices. Some embodiments of the I/O devices 130A-130N may be configured to provide storage or an installation device 116, while others may provide a USB interface for receiving USB storage devices. Still other embodiments include an I/O device 130 that may be a bridge between the system bus 150 and an external communication bus, such as: a USB bus; an RS-232 serial connection; a Small Computer System Interface (SCSI) bus; an IEEE 1394 bus; an Ethernet bus; a Gigabit Ethernet bus; an ATM bus; a High Performance Parallel Interface (HIPPI) bus; a Super HIPPI bus; a SerialPlus bus; a Scalable Coherent Interface (SCI) bus; a FibreChannel bus; or a Serial Attached SCSI (SAS) bus.

In some embodiments, the computing machine 100 may connect to multiple display devices 124A-124N, in other embodiments the computing device 100 may connect to a single display device 124, while in still other embodiments the computing device 100 connects to display devices 124A-124N that are the same type or form of display, or to display devices that are different types or forms. Embodiments of the display devices 124A-124N may be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N. These configurations may include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 may execute any operating system, while in other embodiments the computing machine 100 may execute any of the following operating systems: any embedded operating system; any realtime operating system; any remote operating system; any operating systems for mobile computing devices; or any other operating system. In still another embodiment, the computing machine 100 may execute multiple operating systems. For example, the computing machine 100 may execute a virtualization platform that may execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a digital audio player or any other type and/or form of computing, telecommunications or media device that is capable of communication and that has sufficient processor power and memory capacity to perform the methods and systems described herein. In other embodiments the computing machine 100 may be a mobile device such as any one of the following mobile devices: a cellular telephone or personal digital assistant (PDA); a smart phone; a handheld computing device; any computing device that has different processors, operating systems, and input devices consistent with the device; or any other mobile computing device capable of performing the methods and systems described herein. In one embodiment, the computing device 100 may be a digital audio player which functions as both a portable media player and as a mass storage device. In some embodiments, the computing device 100 may have different processors, operating systems, and input devices consistent with the device.

In some embodiments, the computing device 100 comprises a combination of devices, such as a mobile phone combined with a digital audio player or portable media player. In one of these embodiments, the computing device 100 is a combination digital audio player and mobile phone. In another of these embodiments, the computing device 100 is a smartphone. In another of these embodiments, the computing device 100 is a tablet computer.

Although references herein are generally to desktop disk images, this disclosure is not limited to desktop disk images, and includes other embodiments of images such as server disk images. In some environments for centralized management of desktops, multiple client machines 102 receive copies of a single "golden master" desktop disk image. In one embodiment, a desktop disk image includes files used to execute an operating system and/or an image of an operating system. In another embodiment, the desktop disk image may include a set of applications and customizations. In still another embodiment, the desktop disk image represents a working environment for a user. In yet another embodiment, a desktop disk image may also be referred to as a machine disk image. In some embodiments, a copy of the master desktop disk image provided to a user by a client machine 102 may evolve with time, diverging further from the master desktop disk image as each user applies changes to their working environment. For example, changes resulting from modifying settings, adding or deleting information, and installing new applications may result in differences between one copy and another and between one copy and the master desktop disk image.

Figure 1D:
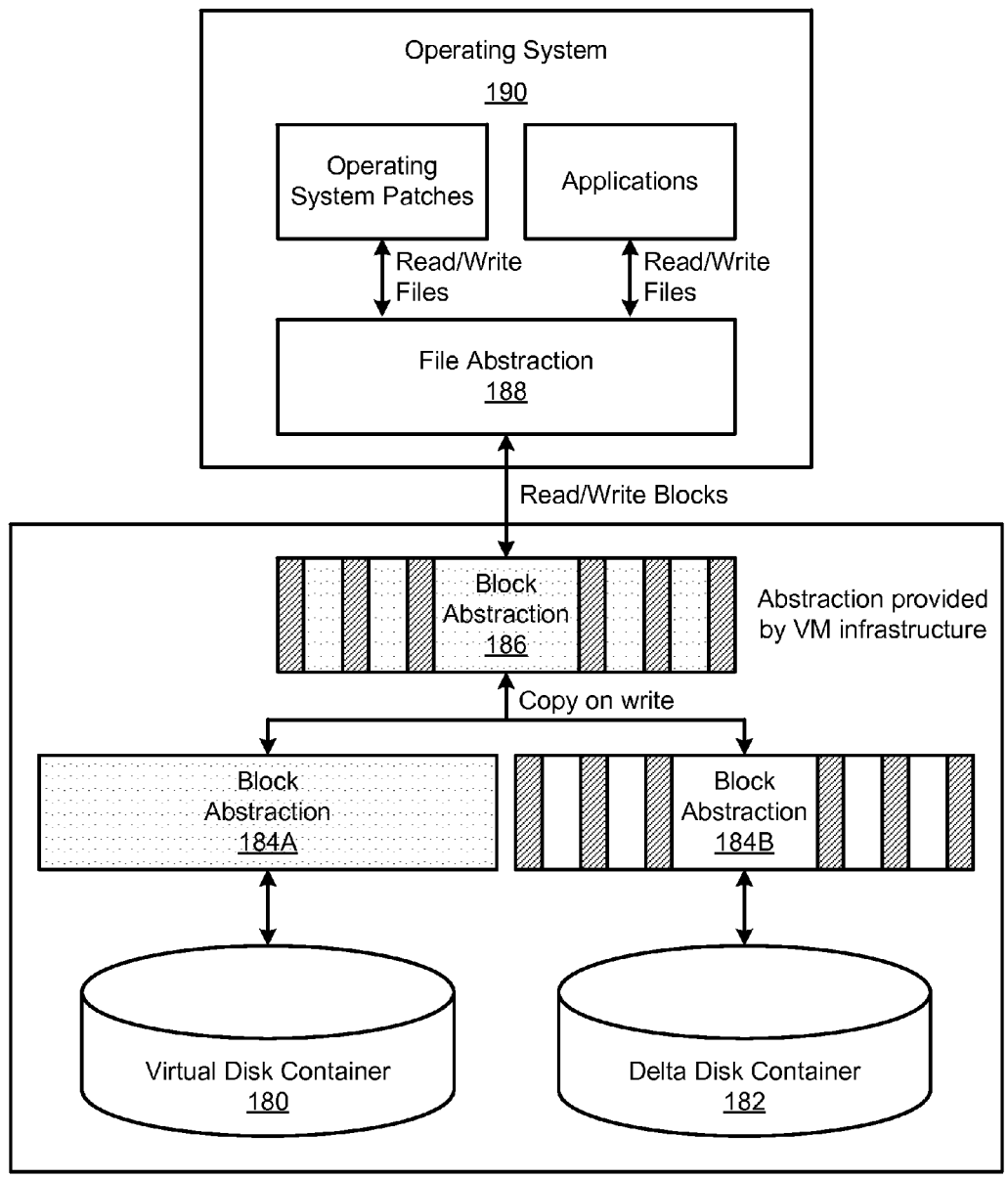
FIG. 1D illustrates a block diagram that depicts an embodiment of the way delta disks are constructed and used in virtual machines in the prior art.

Referring now to FIG. 1D, a block diagram depicts one embodiment of a conventional system for maintaining a desktop disk image for a user. Storage costs for managing a plurality of desktops may be mitigated in some instances by representing each user's desktop environment as a set of differences from a common base disk image 180 (i.e., a delta file identifying at least one user-requested modification). In one embodiment, the common base disk image 180 represents an initial image from which subsequent copies evolved. This approach is commonly supported in, for example, a virtual machine environment. To illustrate the storage requirements in such environments, if each image is 10 GB, and 8 GB of each image is from the common disk image, then the cost for 10 users would be 8 GB+(10 users×2 GB/user)= 28 GB. On the contrary, 10 users×10 GB/user=100 GB of storage would be needed if delta files were not used.

In one virtual machine environment, delta files are commonly generated by a "copy on write" process. In another embodiment, a virtual machine is instantiated using a base disk image 180, or a representation of a disk stored as a file. Other techniques include providing the base disk image 180 as a logical volume accessed via network attached storage. In one embodiment, when the operating system or applications running in the virtual machine executed based upon the base disk image 180 attempt to write new or changed data to the base disk image 180, these changes may be automatically copied or deposited into a secondary or "delta" disk 182. In another embodiment, this implementation enables one base disk image 180 to be used by many virtual machines. In still another embodiment, for a plurality of desktop disk images 190, individual customizations with respect to the common base disk image 180 can then be tracked and contained in separate delta disks 182 corresponding to each of a plurality of modified desktop disk images 190. In some embodiments, a base disk image 180 may be represented as a base disk image 180 and at least one delta disk image, for example, as a single logical unit. In one embodiment, the base disk image component and each of the delta disk image components of the logical unit may be accessed and/or manipulated without affecting the other components.

In one embodiment, a virtual machine may include four levels of abstraction:

Level 0: a virtual disk container 180 for a virtualized disk, which may include a file or set of files such as a logical unit, virtual hard drive image, or disk partition used to instantiate a virtual machine;

Level 1: a block abstraction 184A representing a physical disk to applications executing above the block abstraction 184A;

Level 1a: a set of delta blocks to support 'copy on write' functionality. The delta blocks may be stored in a delta disk container 182, which may include a file or set of files such as a logical unit, virtual hard drive image, or disk partition;

Level 2: a file system abstraction 188 which may include, for example, New Technology File System (NTFS); and Level 3: an operating system 190 which may include files representing an operating system, applications and data.

In one embodiment of a virtual machine environment, using a standard "copy on write" delta disk system, delta files are described in terms of blocks that have been changed. In another embodiment, a plurality of delta files that represent changes made to a block abstraction 184*b* is stored in the delta disk 182. In still another embodiment, a delta disk system describes delta files in terms of files that have been changed. In yet another embodiment, operations involving delta files may be performed at the block level, at the file level, or at both levels.

In one embodiment, when patches are applied, the changes to each machine may be substantially similar, and are shared. In another embodiment, those substantially similar changes are applied and retained on the base disk image, rather than transferred to each of the delta images. In still another embodiment, however, if a base disk image 180 was separately mounted and patched (without reference to a delta disk 182) and if files were modified by a delta, then the arrangement of blocks within the base image might change such that the delta would no longer accurately identify modifications to data requested by a user. The methods and systems described herein provide a solution for updating a plurality of disk images derived from a common base disk image without invalidating delta files.

Figure 2:
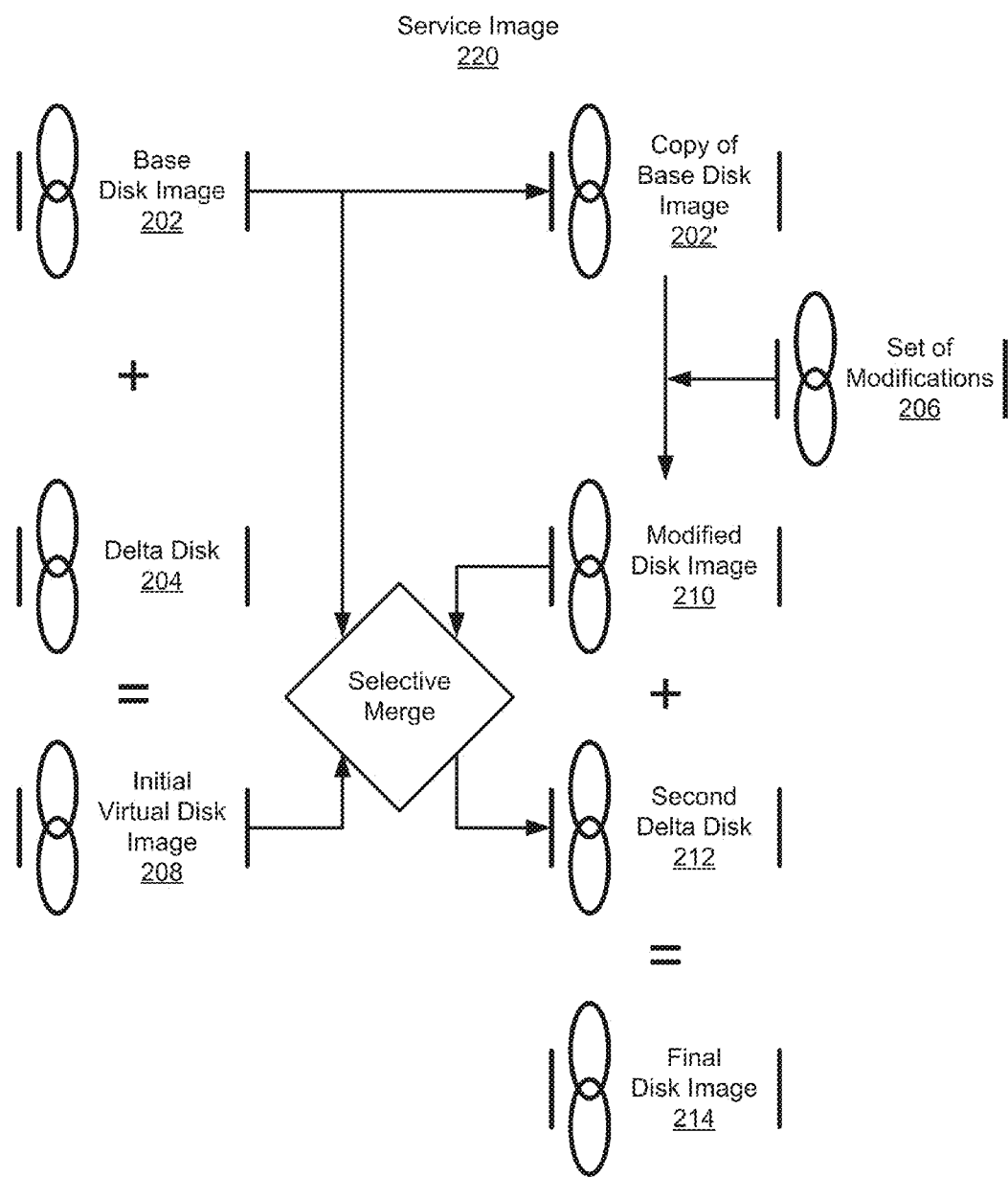
FIG. 2 illustrates a block diagram depicting one embodiment of a system for updating a plurality of disk images derived from a common base disk image and a plurality of delta files.

Referring now to FIG. 2, a block diagram depicts one embodiment of a system for updating a plurality of disk images derived from a common base disk image 202. In brief overview, the system includes a service image 220, a base disk image 202, one of a plurality of delta disks 204, a patch or common set of modifications 206, a copy of the common base disk image 202', a second delta disk 212, a final disk image 214, and mounted disks representing the common base disk image 202, a modified disk image disk 210, and an initial virtual disk image 208. In one embodiment, the service image 220 provides a computing environment that is able to read, write and create delta images, and is able to interpret the disk stacks. In another embodiment, the service image 220 is a computing environment. In still another embodiment, the service image 220 is a collection of at least one tool.

In one embodiment, the service image 220 includes an operating system and a set of tools, which perform operations on data. In another embodiment, the service image 220 includes at least one tool for manipulating disk images, including delta disks. In still another embodiment, the service image 220 includes at least one tool for manipulating files between disk image format and delta file format. In still even another embodiment, the service image 220 mounts one or more of the base disk image 202, the copy of the base disk image 202', the modified disk image 210, and the initial virtual disk image 208 in a computing environment provided by the service image 220. In yet another embodiment, the computing environment is a virtual machine environment. In some embodiments, the corresponding stack of a virtual machine and a compatible operating system are used in a service image 220 that interprets the stack. In other embodiments, the service image 220 is capable of reading from and writing to disk image and delta files, and of reading from and writing to the file systems used by disk images and delta disks.

In one embodiment, the service image 220 includes functionality for applying a delta file from the delta disk 204 to a base disk image 202 to generate an initial virtual disk image 208 comprising a portion of the base disk image modified by the delta file and an unmodified portion of the base disk image. In another embodiment, the service image 220 includes functionality for applying a patch 206 to a copy of the base disk image 202'. In still another embodiment, the service image 220 includes functionality for determining that the patch 206 is applied to a portion of the base disk image 202 corresponding to the unmodified portion of the base disk image 202. In yet another embodiment, the service image 220 includes functionality for applying the delta file from the delta disk 204 to the patched copy 210 of the base disk image 202. In some embodiments, the service image 220 includes a tool for identifying a file listed in a directory of files stored on a mounted image.

In some embodiments, a computing device 100 executes a tool that provides the functionality described in connection with the service image. In one of these embodiments, the tool is a software application executed. In another of these embodiments, the tool may be executed to provide the functionality of a service image without requiring execution of a service image. In still another of these embodiments, the tool includes functionality for applying a delta file from the delta disk 204 to a base disk image 202 to generate an initial virtual disk image 208 comprising a portion of the base disk image modified by the delta file and an unmodified portion of the base disk image. In another of these embodiments, the tool includes functionality for applying a patch 206 to a copy of the base disk image 202'. In yet another of these embodiments, the tool includes functionality for determining that the patch 206 is applied to a portion of the base disk image 202 corresponding to the unmodified portion of the base disk image 202. In yet another of these embodiments, the tool includes functionality for applying the delta file from the delta disk 204 to the patched copy 210 of the base disk image 202.

In one embodiment, the base disk image 202 is an image with which a computing device 100 can execute a virtual machine. In another embodiment, the base disk image 202 is mounted in a computing environment provided by the service image 220. In still another embodiment, the base disk image 202 is not mounted by the service image 220.

In one embodiment, the base disk image 202 functions as a reference image in a merge process, with respect to the modified disk image 210 and the initial virtual disk image 208. In still another embodiment, the merge process is a "three-way merge process" using a reference and two modified versions of the reference. In still even another embodiment, the merge process generates a second delta image 212 incorporating the changes from the set of modifications 206. In yet another embodiment, the computing environment provided by the service image 220 implements the merge process, through use of one of the tools included in the service image 220.

In one embodiment, the copy of the base disk image 202' is a deep copy of the base disk image 202. In another embodiment, a deep copy is a complete copy of the base disk image 202. In still another embodiment, a service image 220 creates a copy of all files in a base disk image 202, which is referred to as a deep copy of the base disk image 202, as opposed to creating an empty delta disk associated with the base disk image, which will store any delta files subsequently created by a user of the base disk image 202 and which may be referred to as a shallow copy of the base disk image 202. In yet another embodiment, a deep copy means a real physical copy as opposed to a virtual copy. In yet even another embodiment, a virtual copy is an empty delta disk and a reference to the original disk image.

In one embodiment, a common set of modifications 206 is a patch, upgrade or other modification to the base disk image 202. In another embodiment, a modified disk image 210 is a virtual disk image generated by applying the set of modifications 206 to the copy of the base disk image 202'. In still another embodiment, the modified disk image 210 functions as an input to the merge process. Although various operations described in this disclosure may apply directly to the modified disk image 210, these operations may also be applied, or modified to apply on the patch 206 (or common set of modifications) and any version of the base disk image 202 giving rise to the modified disk image 208.

In one embodiment, a delta disk 204 stores identifications of one or more differences between one of a plurality of disk images and the base disk image 202. In another embodiment, each of the one or more differences is maintained or processed at the block level. In still another embodiment, a delta disk 204 is one of a plurality of delta disks, each of which contains at least one delta block. In yet even another embodiment, each delta block identifies a modification to the base disk image 202 requested by a user or an application; for example, a delta disk 204 may store at least one delta block identifying a customization requested by a user. In one embodiment, the contents of the delta disk are processed at the block level. In another embodiment, the contents of the delta disk are processed at a file level abstraction, for example, even if the contents are stored at the block level.

In another embodiment, each of the one or more differences is maintained or processed at the file level. In still even another embodiment, a delta disk 204 is one of a plurality of delta disks, each of which contains at least one delta file. In still another embodiment, each delta file identifies a modification to the base disk image 202 requested by a user or an application; for example, a delta disk 204 may store at least one delta file identifying a customization requested by a user. In yet another embodiment, the contents of the delta disk is processed at the file level. In another embodiment, the contents of the delta disk are processed at a block level abstraction, for example, even if the contents are stored at the file level. In still even another embodiment, each delta file contains at least one delta block. In yet another embodiment, the delta disk 204 is empty, indicating that there are no differences between the one of the plurality of disk images and the base disk image 202.

In some embodiments, a delta file identifies a modification requested by a user to a base disk image 202. In one of these embodiments, a delta file represents a modification to an application or operating system to which an instantiation of the base disk image 202 provides access. In another of these embodiments, a delta file represents a modification to a virtual machine instantiated using the base disk image 202. In other embodiments, the delta file is stored in a delta disk 204. In still other embodiments, the delta file is a delta disk 204.

In one embodiment, a delta disk 204 is equivalent to a delta, delta file, or delta disk image. In some embodiments, a delta disk 204 and a delta file are not equivalent. For example, in one of these embodiments, a delta disk 204 includes at least one of a plurality of delta files, each representing at least one difference between a user disk image and the base disk image. In other embodiments, the methods and systems described herein can apply to either a delta disk 204 or a delta file within a delta disk 204. In still other embodiments, a delta disk 204 stores at least one delta file, each delta file representing at least one difference between a user disk image and the base disk image 202. In further embodiments, a delta disk 204 stores a plurality of delta files, each of which represents at least one difference between a user disk image and a base disk image 202. Although this disclosure generally refers to the use of a delta file as a unit associated with various operations described herein, other unit types, such as a delta block or a delta disk, may be used in place of a delta file.

In one embodiment, the initial virtual disk image 208 represents a virtual disk image formed by applying at least one delta file stored in one of a plurality of delta disks 204 to an instantiation of the base disk image 202. In another embodiment, the initial virtual disk image 208 represents a projection of at least one delta file over an instantiation of the base disk image 202. In still another embodiment, a user creates this virtual disk image during normal use of a computing environment provided by the base disk image 202. In yet another embodiment, the delta disk 204 is initially empty and as the user makes changes, the changes are saved in the delta disk 204, for example, using a copy-on-write process. In some embodiments, the initial virtual disk image 208 is an input to the merge process. Although various operations described in this disclosure apply directly to the initial virtual disk image 208, these operations may also be applied, or modified to apply on the at least one delta file and any version of the base disk image 202 from which the initial virtual disk image 208 may be created.

In one embodiment, the final disk image 214 represents a virtual disk image formed by applying at least one file from the second delta image 212 to the modified disk image 210. In another embodiment, the final disk image 214 represents an image which would have resulted from applying the patch 206 to the base disk image 202, which already has the one of a plurality of delta files (for example, from the delta disk 204) applied to it. In still another embodiment, the final disk image 214 is substantially similar to an image resulting from applying the patch 206 to the base disk image 202 that already has the one of a plurality of delta files applied to it. In yet another embodiment, the final disk image 214 is substantially similar to an image resulting from applying the one of a plurality of delta files to the base disk image 202 that already has the patch 206 applied to it.

Figure 3A:
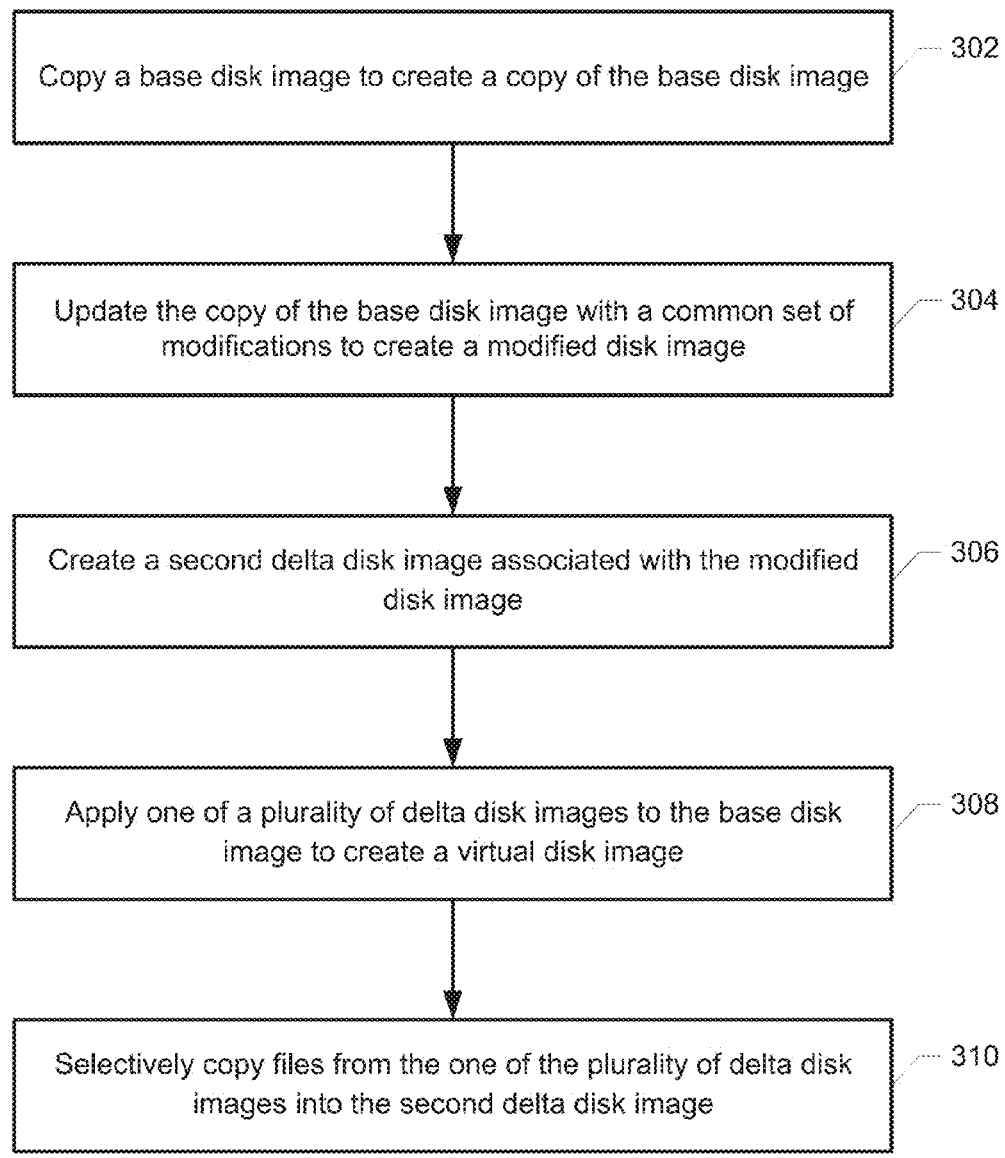
FIG. 3A illustrates a process flow for updating a plurality of disk images derived from a common base disk image and a plurality of delta files.

Referring now to FIG. 3A, a flow diagram depicts one embodiment of a method 300 for updating a plurality of disk images derived from a common base disk image. In brief overview, the method includes copying the base disk image 202 to create a copy of the base disk image 202 (step 302). The method includes updating the copy of the base disk image 202 with a patch 206 to create a patched image (step 304). The method includes creating a second delta disk image 212 associated with the modified disk image (step 306). The method includes applying a delta file from one of a plurality of delta disks to the base disk image 202 to create an initial virtual disk image 208 (step 308). The method includes selectively copying delta files from the one of a plurality of delta disks 204, into the second delta disk image 212 (step 310). In some embodiments, a patch 206 refers to a common set of modifications to be applied to the base disk image 202.

In some embodiments, the method includes instantiating a virtual machine provided by the service image 220 with a set of tools installed in an operating system provided by the virtual machine. In one of these embodiments, the method includes initializing a computing environment provided by the service image 220. In another of these embodiments, the method includes initializing one or more tools included in the service image 220 for implementing a merge process. In another embodiment, the method includes initializing one or more tools for implementing a copy-on-write feature. In yet another of these embodiments, the tools within the virtual machine are used to create disk images 208, 210, and 214.

In step 302, the method includes copying the base disk image to create a copy of the base disk image. In one embodiment, a deep copy is performed to create the copy 202' of the base disk image 202. In another embodiment, the service image 220 creates the copy 202' of the base disk image 202. In still another embodiment, the operation of copying the base disk image includes creation of the second delta disk image 212. In yet another embodiment, the second delta disk image 212 is initially empty when created. In still even another embodiment, a virtual copy of the base image is created, comprising at least one delta disk image and a reference to the base disk image 202.

In step 304, the method includes updating the copy of the base disk image 202 with a patch 206 to create a modified disk image. In one embodiment, a patch 206 is applied to the copy 202' of the base disk image 202 as described below in connection with 354 of FIG. 3B. In another embodiment, a patch 206 is a common set of modifications 206. In still another embodiment, updating the copy 202' results in creation of a patched virtual machine image 210. In one embodiment, creation of the modified disk image 210 results in a disk image that is a patched copy of the base disk image. In another embodiment, a file from the set of modifications 206 is applied to the copy 202' of the base disk image 202 to create the modified disk image 210. In yet another embodiment, creation of the modified disk image 210 does not require knowledge of the file system or block layout within image and delta files, nor of the delta file or image file format.

In one embodiment, a final disk image 214 is created, including the modified disk image 210. In another embodiment, a final disk image 214 is created, including the modified disk image 210 and a second delta disk 212. In still another embodiment, the final disk image 214 is created as a projection of the second delta disk 212 over the modified disk image 210. In some embodiments, the modified disk image 210 represents a new common base image for a plurality of users.

In step 306, a second delta disk image 212 associated with the modified disk image is created. In one embodiment, an empty second delta disk image 212 is created. In another embodiment, the delta disk image 212 is created in conjunction with the modified disk image 210. In still another embodiment, the delta disk image 212 is created when the final disk image 214 is created. In yet another embodiment, the second delta disk 212 is created independently from the modified disk image 210. In still even another embodiment, the second delta disk 212 is associated with the modified disk image 210 after both the second delta disk 212 and the modified disk image 210 are created. In some embodiments, the second delta disk 212 represents the new delta disk for the user associated with the original delta disk 204.

In step 308, one of a plurality of delta disks 204 is applied to the base disk image 202, to create an initial virtual disk image 208. In one embodiment, the method includes applying a delta file within the delta disk 204 to the base disk image 202 to generate an initial virtual disk image 208 comprising a portion of the base disk image 202 modified by the delta image and an unmodified portion of the base disk image 202, as described in greater detail in connection with step 352 of FIG. 3B. In another embodiment, a boot-up process is used to affect the changes from the one of the plurality of delta disks, resulting in creation of the initial virtual disk image 208.

In one embodiment, the method includes mounting the modified disk image 210 and the initial virtual disk image 208 within the virtual machine service image. In another embodiment, the method includes mounting the base disk image 202 in addition to the modified disk image 210 and initial virtual disk image 208. In still another embodiment, the base, modified and initial virtual disk images are mounted in preparation for a "three-way merge". In some embodiments, a "three-way merge" involves merger of an original image together with two sets of changes. In yet another embodiment, a two-way merge could be used, without mounting the base disk image 202 as a reference. However, in some embodiments, two-way merge is less powerful than three-way merge and may not detect the difference between a file deleted in one image, and a file created in another image.

In step 310, the method includes selectively copying delta files from the one of a plurality of delta images 204 into the second delta image 212. In one embodiment, a delta file is copied from the initial virtual disk 208 or from the delta disk 204 to a second delta disk 212 associated with the patched copy 210 of the base disk image 202. In another embodiment, files or blocks are written into the final disk image 214 from at least one of: the initial virtual disk image 208; the modified disk image 210; and the base disk image 202. For example, a selective merge process may be used to write to the final disk image 214. In still another embodiment, a "copy on write" process tracks the files or blocks written into the final disk image 214. In yet another embodiment, the "copy on write" process tracks differences between the modified disk image 210 and the files or blocks written into the final disk image 214. In yet another embodiment, the "copy on write" process copies these differences into the second delta disk 212. In some embodiments, some of these differences are represented by delta files from the delta disk 204.

In one embodiment, a "copy on write" process is used to selectively copy delta files from the delta disk 204 into the second delta image 212. In another embodiment, selective copying of delta files avoids copying any delta files that affect a portion of the base disk image corresponding to the patched portion of the base disk image. In still another embodiment, the method includes determining not to copy one or more delta files that affect a portion of the base disk image corresponding to the patched portion of the base disk image. In yet another embodiment, a rule may be applied to determine whether and how to copy delta files that do correspond to a patched portion of the base disk image.

In one embodiment, a delta file is copied to the second delta disk image 212 for application to the patched copy 210 of the base disk image 202. In another embodiment, a delta file from the second delta disk image 212 is applied to the patched copy of the base disk image. In yet another embodiment, delta files from the second delta disk image 212 can be applied to the patched copy of the base disk image sequentially (i.e., one delta file at a time), or simultaneously (e.g., as a collection of files or a single merged file).

In some embodiments, the method includes examining the initial virtual disk image 208 to find the files that are in the one of a plurality of delta images 204, and not in the base disk image 202. In one of these embodiments, the method includes determining that a delta file in a delta disk 204 does not affect a portion of the base disk image 202 corresponding to a patched portion of the base disk image 202. In another of these embodiments, examining the initial virtual disk image 208 includes determining that the patch is applied to a portion of the base disk image 202 corresponding to the unmodified portion of the base disk image 202, as described below in connection with step 356 of FIG. 3B. In still another of these embodiments, the method includes determining, via a merge process, that the patch is applied to a portion of the base disk image 202 corresponding to the unmodified portion of the base disk image 202. For example, the merge process may be a three-way merge process. In yet another of these embodiments, the method includes applying a delta file in the delta disk 204 to the patched copy of the base disk image 202 as described below in connection with step 358 of FIG. 3B. In this embodiment, the patch 206 does not conflict with the delta file.

Figure 3B:
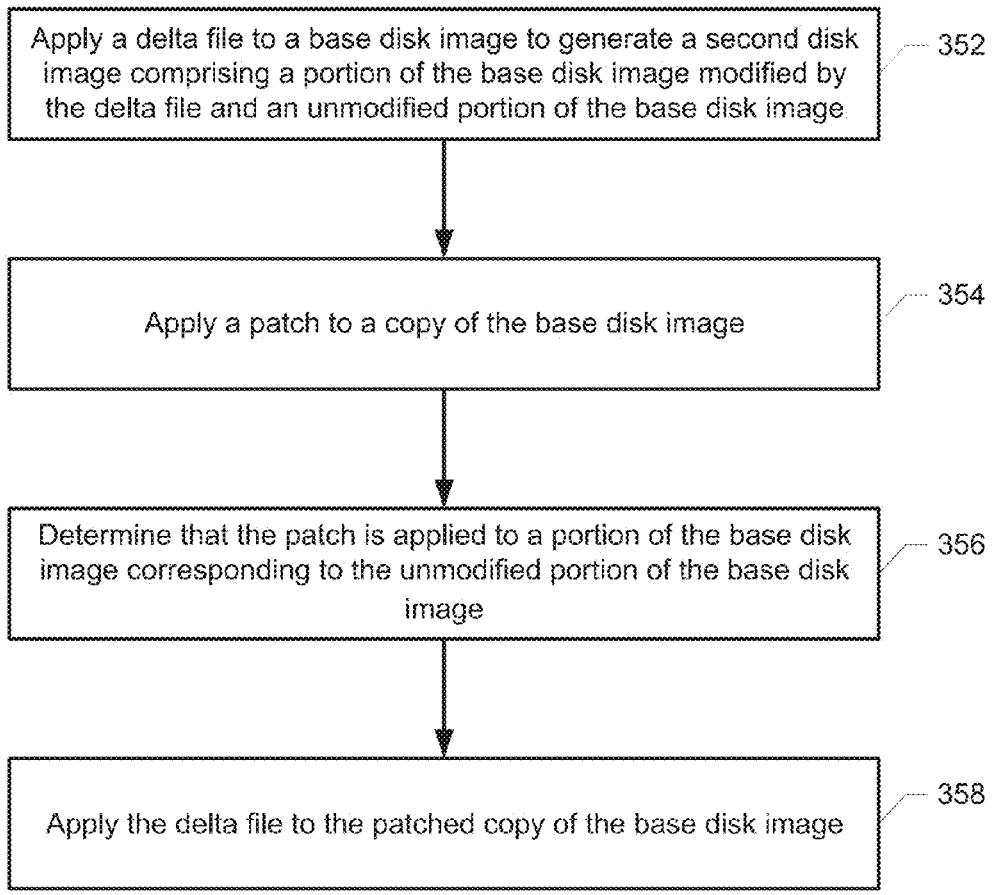
FIG. 3B illustrates a process flow for updating a plurality of disk images derived from a common base disk image and a plurality of delta files.

Referring now to FIG. 3B, a flow diagram depicts one embodiment of a method 350 for updating a plurality of disk images derived from a common base disk image. The method includes applying a delta file to a base disk image to generate an initial virtual disk image comprising a portion of the base disk image modified by the delta file and an unmodified portion of the base disk image (step 352). The method includes applying a patch to a copy of the base disk image (step 354). The method includes determining that the patch is applied to a portion of the base disk image corresponding to the unmodified portion of the base disk image (step 356). The method includes applying the delta file to the patched copy of the base disk image (step 358).

In step 352, a delta file is applied to a base disk image to generate a virtual disk image comprising a portion of the base disk image modified by the delta file and an unmodified portion of the base disk image. In one embodiment, a delta file from the delta disk 204 is applied to the base disk image 202 to generate an initial virtual disk image 208. In another embodiment, the initial virtual disk image 208 includes i) a portion of the base disk image 202 modified by the delta file and ii) a portion of the base disk image 202 unmodified by the delta file.

In step 354, a patch is applied to a copy of the base disk image. In one embodiment, a patch 206 is applied to the copy 202' of the base disk image 202. In another embodiment, a patch update includes mounting the base disk image 202 as a disk in the computing environment provided by the service image 220, and applying the patch 206 from within an operating system made available by the base disk image 202. In still another embodiment, a boot-up process is used to affect the updates resulting in the patched image.

In step 356, the method includes determining that the patch is applied to a portion of the base disk image corresponding to the unmodified portion of the base disk image. In one embodiment, the method includes determining whether a file from the delta disk 204 identifies a modification that would affect a portion of the base disk image 202 corresponding to a patched portion of the base disk image. In another embodiment, the method includes determining whether the patch 206 is applied to a portion of the base disk image corresponding to the unmodified portion of the base disk image or to a portion modified by a delta file. In another of these embodiments, the method includes applying at least one delta file from the delta disk 204 to the patched copy of the base disk image 202. In this embodiment, the delta disk 204 is allowed to modify the patched base disk image 202, because the determination indicated that there would be no conflicts between modifications identified by the patch and those identified by the delta file. In still another of these embodiments, the method includes copying at least one delta file of the delta disk 204, into a second delta disk 212, responsive to the determination.

In one embodiment, the method includes determining not to apply at least one delta file from the delta disk 204 to the patched copy of the base disk image 202, responsive to the determination that the patch 206 is applied to a portion of the base disk image corresponding to the modified portion of the base disk image 202. In this embodiment, applying the patch 206 takes precedence over applying the modification identified by the at least one delta file. In another embodiment, delta files of the delta disk 204 are not copied into a second delta disk image 212, responsive to the determination and to avoid potential conflicts between the patch and the at least one delta file.

In one embodiment, the tools in the service image 220 may perform any of these determinations. In another embodiment, a determination as to whether a patch would affect a portion of the base disk image 208 modified by a file in the delta disk 204 is made by comparing the modified disk image 210 against the base disk image 202 and the initial virtual disk image 208. In still another embodiment, the determination is made based on file modification records that may include file modify times.

In one embodiment, the determination is made without the need to mount the base disk image 202. In another embodiment, the determination is made by performing a deep compare of file contents or attributes. In yet another embodiment, the determination is made by comparing the delta disk 204 or delta file against the initial virtual disk image 208.

In one embodiment, a portion of the disk may be quantified into blocks and the related operations applied at the block level. In another embodiment, a portion of the disk may be quantified into files at the file level, and the related operations applied at the file level. In still another embodiment, some of the steps described in the disclosure may operate at the file level while other steps may operate at the block level. In yet another embodiment, some of the steps described in the disclosure may operate at either the file level or the block level.

In one embodiment, and with respect to registry files, determinations regarding whether to apply a delta file to the patched copy 210 of the disk image 202 are made by evaluating the patched disk image 210 at the key level rather than at the file level. In another embodiment, a determination is made that the patch 206 was applied to a registry key within a portion of the base disk image 202 corresponding to the modified portion of the base disk image. In still another embodiment, a determination is made regarding whether to apply the modification identified by the delta file, at a registry key level, to a portion of the patched copy of the base disk image corresponding to the modified portion of the base disk image. In another embodiment, registry files are processed as mini file systems containing a large number of entries, each of which is analogous to a file. For example, in merging two copies, both of which had modified different entries, a merged copy can be created containing both of these changes. The two copies may include a copy of the registry file with the patch 206 applied, and a copy of the registry file with the delta disk 204 applied; if the same entry is changed in both copies, then timestamps or heuristics may be used in determining which to keep or how to merge the files. In still another embodiment, a merge process, such as a three-way merge process, of registry keys can be performed. For example, the three-way merge may have as inputs an original registry file, a copy of the registry file with the patch 206 applied, and a copy of the registry file with a delta file from the delta disk 204 applied. In another embodiment, responsive to the determination, the delta file is not copied to the second delta disk image 212 associated with the patched copy of the base disk image.

In one embodiment, a determination is made that the patch was applied to a registry key within the base disk image 202 corresponding to a portion of the base disk image unmodified by a delta file. In another embodiment, a modification identified by the delta file is applied, at a key level, to the patched copy of the base disk image because there is no conflict between the modification identified by the delta file (to a modified portion of the base disk image) and the portion of the base disk image modified by the patch (to the unmodified portion of the base disk image). In this embodiment, the delta file does not conflict with the patch 206. In another embodiment, responsive to the determination, the delta file is copied to the second delta disk image 212 associated with the patched copy of the base disk image.

In one embodiment, the method includes determining that the patch is applied to a registry portion of the base disk image corresponding to the modified portion of the base disk image, and applying the delta file, at a key level, to the patched copy of the base disk image. In this embodiment, the delta file is allowed to modify the patched copy of the base disk image in spite of a potential conflict between a modification by the patch and a modification by the delta file. In another embodiment, responsive to the determination, the delta file is copied to the second delta disk image 212 associated with the patched copy of the base disk image.

In one embodiment, the method includes the steps of determining that the patch is applied to a registry portion of the base disk image corresponding to the modified portion of the base disk image, and determining not to apply the delta file to the patched copy of the base disk image. In this embodiment, the patch 206 takes precedence over the delta file. In another embodiment, responsive to the determination, the delta file is not copied to the second delta disk image 212 associated with the patched copy of the base disk image.

In some embodiments, the methods discussed above can be applied to database or log-files. Database files contain many entries and can, in some embodiments, be merged in the way as described above in connection with registry files. Log-files contain lists of entries each with a timestamp and sorted in time order. Two such files may be merged by aggregating and resorting the entries. For example, and in one embodiment, the method includes determining that the patch is applied to a database or a log-file portion of the base disk image corresponding to the modified portion of the base disk image, and merging the delta file, using timestamps and/or heuristics, to a portion of the patched copy of the base disk image corresponding to the modified portion of the base disk image. In another embodiment, a three-way merge of database or log files can be performed. In still another embodiment, the delta file is not copied to the second delta disk image 212 associated with the patched copy of the base disk image.

In one embodiment, the method includes determining that the patch is applied to a database or a log-file portion of the base disk image corresponding to the unmodified portion of the base disk image and applying the delta file to the patched copy of the base disk image. In this embodiment, the delta file does not conflict with the patch 206. In another embodiment, responsive to the determination, the delta file is copied to the second delta disk image 212 associated with the patched copy of the base disk image.

In one embodiment, the method includes determining that the patch is applied to a database or a log-file portion of the base disk image corresponding to the modified portion of the base disk image, and applying the delta file to the patched copy of the base disk image. In this embodiment, the delta file is allowed to modify the patched copy of the base disk image. In another embodiment, responsive to the determination, the delta file is copied to the second delta disk image 212 associated with the patched copy of the base disk image.

In one embodiment, the method includes determining that the patch is applied to a database or a log-file portion of the base disk image corresponding to the modified portion of the base disk image, and determining not to apply the delta file to the patched copy of the base disk image. In this embodiment, the patch 206 takes precedence over the delta file. In another embodiment, responsive to the determination, the delta file is not copied to the second delta disk image 212 associated with the patched copy of the base disk image.

In some of these embodiments, a rule engine is used to resolve a file level conflict. File level conflicts may occur when a file is changed in the base disk image 202 resulting from both the patch 206 and the delta disk image 204. In one embodiment, the rules indicate whether changes from the patch 206 or the delta disk image 204 should get preference, or whether a special merge operation is required. For example, the rules can be in the form of a wildcard list of files that should take precedence over other modifications:

C:/Windows/System32/<any> : D "wins"

<any>/NTUser.Dat : merge using Registry_merge technique

In one embodiment, the rule engine determines whether to copy a delta file to the second delta image 212. In another embodiment, the rule engine operates with, or is used in conjunction with a three-way merge process. In still another embodiment, an administrator may specify the rules. In yet another embodiment, a machine may generate the rules based on any algorithm, guideline, formula, or any historical and/or statistical data.

In some embodiments, the following listing includes examples of rules or commands used in association with file level conflicts. In one embodiment, a file level conflict may occur when a change to a file in the modified disk image 210 is different from a change applied to the corresponding file in the initial virtual disk image 208. In another embodiment, one or more of these rules or commands are associated with a rule engine. In some embodiments, the following listing includes examples of rules or commands used in association with one or more of: registry keys, log files and database files.

In some embodiments, rules are applied responsive to a file level conflict. In other embodiments, the rules engine includes commands for initiating the rules in the rule engine.

In other embodiments, the rules engine includes commands for adding rules into the rule engine. In one of these embodiments, one or more rules are generated in response to executing each of these commands. In another of these embodiments, the rules engine includes one or more rules which can be applied responsive to a file level conflict. For example, in still another of these embodiments, if the base disk image 202 had a file X and this file was deleted in both the first and second images, then this may not be considered a file level conflict. If, however, X was modified in the initial virtual disk image 208 and deleted in the modified disk image 210 then this may be considered a file level conflict.

In some embodiments, a command or rule may have a plurality of arguments. In one of these embodiments, the first argument of the command identifies one or more files or registry keys affected by the rule. The first argument may identify one or more registry keys, log files, database files, other types of files, or a collection of different types of files. In another of these embodiments, the first argument of the command includes one or more of: a directory path description, a file name, and pattern-matching strings for directory, file or path names. In some of these embodiments, the second argument describes the action of the rule. In still another of these embodiments, the second argument describes an action on the identified one or more files. In yet another of these embodiments, the third argument contains a description or comment, for example, from the administrator. In still another embodiment, the third argument is optional.

In some embodiments, the second argument may be at least one of HandleBy.copy, HandleBy.ignore, and HandleBy.registryMerge. In one of these embodiments, the action "HandleBy.copy" directs the system to copy the corresponding delta file from the delta disk 204 to the second delta disk 212. In another of these embodiments, the action "HandleBy.copy" directs the system to copy the corresponding delta file from the initial virtual disk image 208 to the second delta disk 212. In this embodiment, the rule may determine that a change from the delta file takes precedence over a change from the patch 206. In still another of these embodiments, the action "HandleBy.ignore" directs the system to not copy the corresponding delta file or delta change into the second delta disk 212. In this embodiment, the rule may determine that a change from the patch 206 takes precedence over a change identified by the delta file. In still even another of these embodiments, the action HandleBy.registryMerge directs the system to perform a merging process for registry files identified by the rule. In yet another of these embodiments, a particular action applies only to one type of file. For example, in one of these embodiments, HandleBy.registryMerge may apply only to a registry key.

As an example, and in one embodiment, the following command:

rules.Add(@"\windows\security\*", HandleBy.ignore, "security");

when executed, adds a rule to the rule engine. In this example, the rule applies to files matching the search patch specified by "\windows\security\*", including any child directories. In another embodiment, the action directs the system to ignore the changes by the delta file and therefore not copy the delta file into the second delta disk 212. In still another embodiment, the administrator adds a comment ("security") to the rule indicating that this rule applies to security files.

In one embodiment, HandleBy.copy and HandleBy.ignore belong to a plurality of primary rules. In another embodiment, HandleBy.registryMerge is one of a plurality of secondary rules. In still another embodiment, HandleBy.copy, HandleBy.ignore, and HandleBy.registryMerge may be primary or secondary rules. In one embodiment, one or more of these rules may be determined, through experimentation, analysis, or otherwise, to handle the specified files or registry keys in a preferred way or to meet certain performance standards, quality of service, or standards for user experience. It is to be understood that the following listing of sample rules is for illustration purposes and not by way of limitation:

rules.Add(@"\pagefile.sys", HandleBy.ignore);
rules.Add(@"\windows\schedlgu.txt", HandleBy.copy);
rules.Add(@"\windows\oewablog.txt", HandleBy.ignore);
rules.Add(@"\windows\debug\oakley.log", HandleBy.copy, "from experiments");
rules.Add(@"\windows\debug\oakley.log.sav", HandleBy.copy, "from experiments");
rules.Add(@"\windows\debug\usermode\userenv.log", HandleBy.copy);
rules.Add(@"\windows\prefetch\layout.ini", HandleBy.ignore);
rules.Add(@"\windows\prefetch\*.pf", HandleBy.ignore);
rules.Add(@"\windows\softwaredistribution\datastore\datastore.edb", HandleBy.copy);
rules.Add(@"\windows\softwaredistribution\datastorelogs\*", HandleBy.copy);
rules.Add(@"\windows\windowsupdate.log", HandleBy.ignore);
rules.Add(@"\system volume information\_restore*", HandleBy.ignore, "guess");
rules.Add(@"\system volume information\*", HandleBy.ignore, "guess");
rules.Add(@"\windows\security\edb.chk", HandleBy.copy, "from experiments");
rules.Add(@"\windows\security\edb.log", HandleBy.copy, "from experiments");
rules.Add(@"\windows\system32\catroot2\*", HandleBy.copy, "guess");
rules.Add(@"\windows\security\*", HandleBy.ignore, "security TODO");
rules.Add(@"\windows\system32\perfc009.dat", HandleBy.ignore);
rules.Add(@"\windows\system32\perfh009.dat", HandleBy.ignore);
rules.Add(@"\windows\system32\perfstringbackup.ini", HandleBy.ignore, "perf counter backup");
rules.Add(@"\windows\system32\fntcache.dat", HandleBy.ignore, "font cache");
rules.Add(@"\windows\system32\wpa.dbl", HandleBy.copy, "windows activation");
rules.Add(@"\windows\system32\config\*.evt", HandleBy.ignore);
rules.Add(@"\windows\system32\config\default", HandleBy.registryMerge);
rules.Add(@"\windows\system32\config\sam", HandleBy.registryMerge);
rules.Add(@"\windows\system32\config\security", HandleBy.registryMerge);
rules.Add(@"\windows\system32\config\software", HandleBy.registryMerge);
rules.Add(@"\windows\system32\config\system", HandleBy.registryMerge);
rules.Add(@"\windows\system32\config\default.log", HandleBy.ignore);
rules.Add(@"\windows\system32\config\sam.log", HandleBy.ignore);
rules.Add(@"\windows\system32\config\security.log", HandleBy.ignore);
rules.Add(@"\windows\system32\config\software.log", HandleBy.ignore);
rules.Add(@"\windows\system32\config\system.log", HandleBy.ignore);
rules.Add(@"\windows\system32\config\newsid backup\*", HandleBy.copy);
rules.Add(@"\windows\system32\config\systemprofile\ntuser.dat", HandleBy.registryMerge);
rules.Add(@"\windows\system32\config\systemprofile\ntuser.dat.log", HandleBy.registryMerge);
rules.Add(@"\windows\system32\config\systemprofile\local settings\temporary internet files\contentie5\index.dat", HandleBy.ignore);
rules.Add(@"\windows\system32\config\systemprofile\local settings\history\history.ie5\index.dat", HandleBy.ignore);
rules.Add(@"\windows\system32\wbem\logs\*.log", HandleBy.ignore);
rules.Add(@"\windows\system32\wbem\repository\fs", HandleBy.wmiMerge);
rules.Add(@"\documents and settings\"+BaseAdminAccount, HandleBy.ignore);
rules.Add(@"\documents and settings\*\ntuser.dat", HandleBy.registryMerge);
rules.Add(@"\documents and settings\*\ntuser.dat.log", HandleBy.ignore);
rules.Add(@"\documents and settings\*\local settings\application data\microsoft\windows\usrclass.dat", HandleBy.registryMerge);
rules.Add(@"\documents and settings\*\local settings\application data\microsoft\windows\usrclass.dat.log", HandleBy.ignore);
rules.Add(@"\documents and settings\*\start menu\programs\accessories\entertainment\windows media player.lnk", HandleBy.copy);
rules.Add(@"\Microsoft\Windows NT\CurrentVersion\Winlogon\Notify\WgaLogon\Settings\Data", HandleBy.copy);
rules.Add(@"\Microsoft\WZCSVC\Parameters\Interfaces\ActiveSettings", HandleBy.copy);
rules.Add(@"\Microsoft\Windows NT\CurrentVersion\Prefetcher\StartTime", HandleBy.ignore);
rules.Add(@"\Microsoft\Windows NT\CurrentVersion\Prefetcher\TracesProcessed", HandleBy.ignore);
rules.Add(@"\Microsoft\Windows NT\CurrentVersion\Prefetcher\TracesSuccessful", HandleBy.ignore);
rules.Add(@"\Microsoft\Windows NT\CurrentVersion\Prefetcher\ExitTime", HandleBy.ignore);
rules.Add(@"\Microsoft\DirectDraw\MostRecentApplication\ID", HandleBy.ignore);
rules.Add(@"\Microsoft\Windows NT\CurrentVersion\Prefetcher\ExitTime", HandleBy.ignore);

```
rules.Add(@"\Microsoft\Windows
   NT\CurrentVersion\ProfileList\*\ProfileLoadTime
   Low", HandleBy.ignore);
rules.Add(@"\Microsoft\Windows
   NT\CurrentVersion\ProfileList\*\ProfileLoadTime
   High", HandleBy.ignore);
rules.Add(@"\Microsoft\Windows
   NT\CurrentVersion\Winlogon\Notify\WgaLogon\
   Settings\Data", HandleBy.copy);
rules.Add
   (@"\ControlSet*\Control\Lsa\SspiCache\Time",
   HandleBy.ignore);
rules.Add
   (@"\ControlSet*\Control\Print\Providers\LogonTime",
   HandleBy.ignore);
rules.Add
   (@"\ControlSet*\Control\Watchdog\Display\Shut
   downCount", HandleBy.ignore);
rules.Add
   (@"\ControlSet*\Control\Windows\ShutdownTime",
   HandleBy.ignore);
rules.Add(@"\Microsoft\Rpc\UuidSequenceNumber",
   HandleBy.copy);
rules.Add
   (@"\Software\Microsoft\Windows\CurrentVersion\
   Explorer\Shell Folders\AppData", HandleBy.copy);
rules.Add
   (@"\Software\Microsoft\Windows\CurrentVersion\
   Explorer\Shell Folders\Cookies", HandleBy.copy);
rules.Add
   (@"\Software\Microsoft\Windows\CurrentVersion\
   Explorer\Shell Folders\Cache", HandleBy.copy);
rules.Add(@"\Classes\ftp\DefaultIcon\", HandleBy.copy,
   "user installed alt browser");
rules.Add(@"\Classes\ftp\shell\open\command\",
   HandleBy.copy, "user installed alt browser");
rules.Add(@"\Classes\http\shell\open\command\",
   HandleBy.copy, "user installed alt browser");
rules.Add(@"\Classes\https\shell\open\command\",
   HandleBy.copy, "user installed alt browser");
rules.Add
   (@"\Microsoft\Windows\CurrentVersion\Group
   Policy\State\Machine\Extension-List\*\StartTimeLo",
   HandleBy.ignore);
rules.Add
   (@"\Microsoft\Windows\CurrentVersion\Group
   Policy\State\Machine\Extension-List\*\StartTimeHi",
   HandleBy.ignore);
rules.Add
   (@"\Microsoft\Windows\CurrentVersion\Group
   Policy\State\Machine\Extension-List\*\EndTimeLo",
   HandleBy.ignore);
rules.Add
   (@"\Microsoft\Windows\CurrentVersion\Group
   Policy\State\Machine\Extension-List\*\EndTimeHi",
   HandleBy.ignore);
rules.Add
   (@"\Microsoft\Windows\CurrentVersion\Group
   Policy\State\*\Extension-List\*\StartTimeLo", HandleBy.copy);
rules.Add
   (@"\Microsoft\Windows\CurrentVersion\Group
   Policy\State\*\Extension-List\*\StartTimeHi", HandleBy.copy);
rules.Add
   (@"\Microsoft\Windows\CurrentVersion\Group
   Policy\State\*\Extension-List\*\EndTimeLo", HandleBy.copy);
rules.Add
   (@"\Microsoft\Windows\CurrentVersion\Group
   Policy\State\*\Extension-List\*\EndTimeHi", HandleBy.copy);
rules.Add
   (@"\Microsoft\Windows\CurrentVersion\Internet
   Settings\Cache\Paths\Directory", HandleBy.copy);
rules.Add
   (@"\Microsoft\Windows\CurrentVersion\Internet
   Settings\Cache \Paths\path1\CachePath", HandleBy.copy);
rules.Add
   (@"\Microsoft\Windows\CurrentVersion\Internet
   Settings\Cache\Paths\path2\CachePath", HandleBy.copy);
rules.Add
   (@"\Microsoft\Windows\CurrentVersion\Internet
   Settings\Cache\Paths\path3\CachePath", HandleBy.copy);
rules.Add
   (@"\Microsoft\Windows\CurrentVersion\Internet
   Settings\Cache\Paths\path4\CachePath", HandleBy.copy);
rules.Add(@"\ControlSet*\Services\Tcpip\Parameters\
   Interfaces\*\LeaseObtainedTime", HandleBy.copy);
rules.Add(@"\ControlSet*\Services\Tcpip\Parameters\
   Interfaces\*\T1", HandleBy.copy);
rules.Add(@"\ControlSet*\Services\Tcpip\Parameters\
   Interfaces\*\T2", HandleBy.copy);
rules.Add(@"\ControlSet*\Services\Tcpip\Parameters\
   Interfaces\*\LeaseTerminatesTime", HandleBy.copy);
rules.Add
   (@"\ControlSet*\Services\*\Parameters\Tcpip\Lease
   ObtainedTime", HandleBy.copy);
rules.Add
   (@"\ControlSet*\Services\*\Parameters\Tcpip\T1",
   HandleBy.copy);
rules.Add
   (@"\ControlSet*\Services\*\Parameters\Tcpip\T2",
   HandleBy.copy);
rules.Add
   (@"\ControlSet*\Services\*\Parameters\Tcpip\Lease
   TerminatesTime", HandleBy.copy);
rules.Add(@"\ControlSet*\Services\*\parameters\Guid",
   HandleBy.copy);
rules.Add
   (@"\ControlSet*\Services\SharedAccess\Epoch\
   Epoch", HandleBy.copy);
rules.Add(@"\Microsoft\Cryptography\RNG\Seed",
   HandleBy.copy);
rules.Add(@"\Microsoft\Windows
   NT\CurrentVersion\LastFontSweep\LastSweepTime",
   HandleBy.copy);
rules.Add(@"\Microsoft\SystemCertificates\AuthRoot\
   Certificates\*\Blob", HandleBy.copy);
rules.Add
   (@"\Microsoft\SystemCertificates\CA\Certificates\*\
   Blob", HandleBy.copy);
rules.Add(@"\SAM\Domains\Account\Users\*\F",
   HandleBy.copy);
rules.Add(@"\Classes\*\shell\open\command\", HandleBy.copy);
``` rules.Add
 (@"\Software\Microsoft\Windows\CurrentVersion\
 Explorer\Shell Folders\AppData", HandleBy.ignore);
rules.Add
 (@"\Software\Microsoft\Windows\CurrentVersion\
 Explorer\Shell Folders\Cookies", HandleBy.ignore);
rules.Add
 (@"\Software\Microsoft\Windows\CurrentVersion\
 Explorer\Shell Folders\Cache", HandleBy.ignore);
rules.Add
 (@"\Software\Microsoft\Windows\CurrentVersion\
 Explorer\Shell Folders\History", HandleBy.ignore);
rules.Add
 (@"\Software\Microsoft\Windows\CurrentVersion\
 Internet Settings\Connections\SavedLegacySettings",
 HandleBy.ignore);
rules.Add
 (@"\Microsoft\Windows\CurrentVersion\Internet
 Settings\Zones\*\*", HandleBy.ignore);
rules.Add(@"\ControlSet*\Services\*\Performance\*",
 HandleBy.ignore);
rules.Add
 (@"\ControlSet*\Services\Eventlog\System\Sources",
 HandleBy.ignore);
rules.Add
 (@"\ControlSet*\Services\Tcpip\Performance.Wbem
 AdapFileSignature", HandleBy.ignore);
rules.Add
 (@"\Microsoft\WBEM\CIMOM\LastFullDredge
 Timestamp", HandleBy.copy);
rules.Add
 (@"\Microsoft\WBEM\PROVIDERS\Performance\
 Performance Data", HandleBy.ignore);
rules.Add
 (@"\ControlSet*\Services\Tcpip\Performance.Wbem
 AdapFileSize", HandleBy.ignore);
rules.Add
 (@"\Software\Microsoft\Windows\CurrentVersion\
 Explorer\Shell Folders\History", HandleBy.copy);
rules.Add
 (@"\Software\Microsoft\Windows\CurrentVersion\
 Internet Settings\Connections\SavedLegacySettings",
 HandleBy.copy);
rules.Add(@"\Microsoft\Cryptography\RNG.Seed\",
 HandleBy.copy);
rules.Add
 (@"\Microsoft\DirectDraw\MostRecentApplication\
 ID", HandleBy.copy);
rules.Add
 (@"\Microsoft\PCHealth\PchSvc\DataCollection",
 HandleBy.copy);
rules.Add(@"\Microsoft\Windows
 NT\CurrentVersion\LicenseInfo", HandleBy.copy);
rules.Add(@"\ControlSet*\Control\Session
 Manager\AppCompatibility\AppCompatCache",
 HandleBy.copy);
rules.Add(@"\ControlSet*\Control\Session
 Manager\Memory
 Management\PrefetchParameters\VideoInitTime",
 HandleBy.copy);
rules.Add(@"\ControlSet*\Control\Session
 Manager\Power\AcPolicy", HandleBy.copy);
rules.Add(@"\ControlSet*\Control\Session
 Manager\Power\DcPolicy", HandleBy.copy);
rules.Add
 (@"\ControlSet*\Services\Dhcp\Parameters\*",
 HandleBy.copy);
rules.Add(@"\ControlSet*\Services\Tcpip\Parameters\
 Interfaces\*\DhcpIPAddress", HandleBy.copy);
rules.Add
 (@"\ControlSet*\Services\*\Parameters\Tcpip\Dhcp
 IPAddress", HandleBy.copy In some embodiments, a tool (e.g., a tool provided by a service image 220) analyzes the portions of the base disk image, the first disk image 210, and the initial virtual disk image 208 to determine how to resolve conflicts. In one of these embodiments, the tool accesses a mapping of changes to operations to determine how to resolve a conflict. In another of these embodiments, by way of example, and without limitation, the mapping has the following form:

| Portion of base disk image 202 | Portion of modified disk image 210 | Portion of initial virtual disk image 208 | Operation or Rule |
|---|---|---|---|
| Reference | No change | No change | No copy or merge needed |
| Reference | No change | Change | Copy |
| Reference | Change | No change | No copy or merge needed |
| Reference | Change | Change | Merge |

In some embodiments, the operations are determined by the rules or the rule engine. In other embodiments, one or more of the copy and merge operations are operations as described above in connection with the different file types. In one embodiment, the method includes a first scan to determine the changes corresponding to the base disk image 202. In another embodiment, the method includes a first scan to determine the changes corresponding to the authoritative reference image. In still another embodiment, information regarding these changes are cached or stored for use with subsequent delta images corresponding to other users.

In step 358, the method includes applying the delta file to the patched copy of the base disk image. In one embodiment, the method includes applying, via a three-way merge process, the delta disk 204 to the patched copy of the base disk image. In another embodiment, the method includes copying one or more delta files of the delta disk 204, into a second delta disk image 212, responsive to the determination. In still another embodiment, the second delta disk image 212 is associated with the patched copy 210 of the base disk image.

In one embodiment, the final virtual disk image 214 corresponding to the one of a plurality of delta disks 204 will, as a result of applying the second delta disk image 212 to the modified disk image, incorporate changes from both the patch 206 and the delta disk 204. The result is achieved as if the patch 206 had been directly applied onto the base disk image 202 with the modifications identified by files in the delta disk 204 already applied to it.

In another embodiment, it is not required to boot each image after applying a file from a delta disk 212, as everything may be run within one 'service' image operating system. In still another embodiment, the boot-up process is used on the operating system within the computing environment provided by the service image 220, followed by mounting the disks to the computing environment. Although this can normally be done without having to reboot the operating system, some embodiments of virtual machine systems may implement a reboot for each set of disks. In some embodiments, when this is the case, the service image 220 is initialized, and this can be made faster than a 'normal' boot, by reducing the size and complexity of the service image 220.

In one embodiment, the method includes caching information about files in the base disk image 202 and in the modified disk image 210 during a first scan, which eliminates this step for other subsequent delta disks 204. In still another embodiment, the method includes discarding the original base disk image 202 and all of the plurality of delta images when a set of second delta images have been created.

In one embodiment, the application of the method may, in some instances, result in less overall processing and storage overheads compared to typical existing methods of updating a plurality of disk images derived from a common base disk image and a plurality of delta images, with a common set of modifications.

In another embodiment, the method processes disk images which support multiple delta files or 'chained deltas'. The method includes the steps of identifying files common to several delta disks, but not in the base disk image 202, and recreating a more complex arrangement of delta files to put such common files into a shared intermediate image.

In some embodiments, the method includes, for each of the plurality of delta images, applying the set of modifications or patch 206 to the base disk image 202 which already has the delta disk image 204 applied over it, resulting in an authoritative reference image. In some of these embodiments, this is referred to as "conservative rebasing". In one embodiment, the method includes applying a patch to the initial virtual disk image 208. In another embodiment, the method includes applying a patch to a copy of the initial virtual disk image 208 to create an authoritative reference image. In still another embodiment, the method includes determining that the patch is applied to a portion of the copy of the initial virtual disk image 208 corresponding to a portion of the base disk image modified by a delta file and determining that the patch in the patched copy of the base disk image is applied to a portion of the base disk image unmodified by the delta file. In yet another embodiment, the method includes applying the delta file to the patched copy of the base disk image.

In one embodiment, the method includes copying the delta file to the second delta disk image 212, responsive to the determination. In another embodiment, the method includes applying the delta file to the patched copy of the base disk image. In some embodiments, the method includes application of a rule identified in a mapping, such as, for example, a rule identified in a table of the following form:

| Portion of base disk image 202 | Portion of modified disk image 210 | Portion of authoritative reference image | Operation or Rule |
|---|---|---|---|
| Reference | No change | No change | No copy or merge needed |
| Reference | No change | Change | Copy (or no copy or merge, if rules specify so) |
| Reference | Change | No change | Copy (or no copy or merge, if rules specify so) |
| Reference | Change | Identical Change | No copy or merge needed |
| Reference | Change | Different Change | Copy (or no copy or merge, if rules specify so) |

In some embodiments, the operations are identified by a rule engine, as described above in connection with FIGS. 3A-3B. In other embodiments, one or more of the copy and merge operations is as described above in connection with FIGS. 3A-3B. In one embodiment, a first scan determines the changes and this information is cached or stored for use with subsequent delta images corresponding to other users.

In one embodiment, conservative rebasing is applied in association with each of the plurality of delta disk images. In another embodiment, conservative rebasing is selectively applied to some of the plurality of delta disk images. In still another embodiment, conservative rebasing is applied in association with a first delta disk image to determine whether to apply conservative rebasing to a second delta disk image. For example, it may be preferable to use conservative rebasing to generate new delta disk images 212 in association with a particular patch 206 or a change to a particular portion of the base disk image.

In one of these embodiments, conservative rebasing uses the authoritative reference in parallel with the rule engine, when determining how to merge files. In another of these embodiments, conservative rebasing includes discarding the authoritative reference image when it is no longer needed. In still another of these embodiments, conservative rebasing offers an alternative to using a rule engine to determine how to handle conflicts, by providing a definitive reference in handling conflicts. In some embodiments of the rule engine, the set of rules it carries embodies an understanding of how file conflicts should be handled, but this understanding is an approximation, as patches can perform arbitrary changes when actually implemented. In yet another embodiment, conservative rebasing incurs a greater computational cost during patching, but retains the storage cost advantages of the embodiments described above.

In some embodiments, a copy of the base image 202 is created. In one of these embodiments, the copy of the base disk image is associated with one of a plurality of delta disk images, each of the plurality of delta disk images storing at least one user-generated disk image modification. In another of these embodiments, the base disk image is modified with at least one shared modification file (e.g., at least one patch). In still another of these embodiments, a copy of the modified base disk image 210 is created. In yet another of these embodiments, the copy of the modified base disk image 210 is associated with the one of the plurality of delta disk images; for example, by applying a modification identified by a delta disk to the copy of the modified base disk image 210 the delta disk and the copy of the modified base disk image may be associated.

In some embodiments, the method described provides functionality for managing delta disk images at the file level rather than at the block level, making it possible to patch the common base disk image 202 without the need to recreate the delta files. In one embodiment, a rule engine is used to handle file conflicts. In another embodiment, a decision is made as to whether changes from the patch 206 or the delta disk image 204 should get preference.

A method for updating, in a virtual machine environment, a plurality of disk images with a patch 206, each of the plurality of disk images comprising a delta disk image 204 derived from a common base disk image 202, includes applying a patch to a first copy of a disk image 202', in at least one file. The method includes generating a modified disk image 210 including the patched first copy of the disk image. The method includes applying at least one modification from a delta disk image 204 to an initial virtual machine image 208 comprising a second copy of the common base disk image. The method includes determining whether a portion of the patched first copy of the disk image 210 is affected by the delta disk image 204.

The method includes applying a rule to determine whether to apply the delta disk image 204 on the affected portions, or to replace the affected portions with a new file. In some embodiments, the determination depends on a combination of one or more of the file type, file location, file attributes or file properties. In other embodiments, the extent of changes on the file by the modifications from the delta disk image 204 impacts the determination. In still other embodiments, the extent of changes on the file by the common set of modifications impacts the determination.

In one embodiment, the new file represents the original disk image file as modified by the patch 206. In another embodiment, the new file represents the original disk image file modified by a combination of the patch 206 and the delta disk image 204. In still another embodiment, the new file is generated by a rule defined by a user to give an approximation to a file derived from an existing method for updating a delta disk image. One embodiment of an existing method includes directly applying the common set of modifications 206 onto the common base disk image 202 with the delta disk image already applied.

In some embodiments, the second delta disk image 212 contains both original files from the original delta image, and replaced files. In one embodiment, applying the second delta disk image onto the modified disk image 210 results in a disk image, equivalent to a disk image derived from the common base disk image 202 directly modified by both the delta disk image 204 and the common set of modifications 206 in an existing method. In another embodiment, applying the second delta disk image 212 onto the modified disk image 210 results in a disk image which is an approximation of a disk image derived from the common base disk image 202 directly modified by both the delta disk image 204 and the patch 206 in an existing method.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Section B: Booting System

As used herein, the terms "MBR" (Master Boot Record), "storage driver", and "network filter driver" refer to bootstrapping software modules described herein. A convention of preceding such modules' names with "O/S" has been adopted. In addition, the terms "virtual drive", "boot drive" and "server drive" are used synonymously in the description that follows.

Figure 4A:
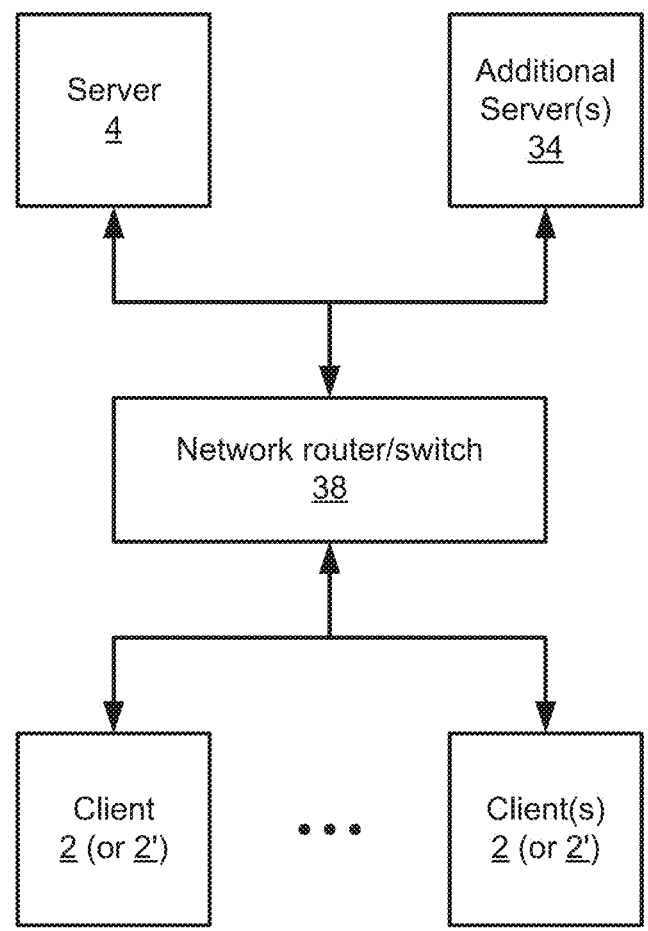
FIGS. 4A-4C illustrate block diagrams depicting one embodiment of a client/server network environment in which the present disclosure may be practiced.
Figure 4B:
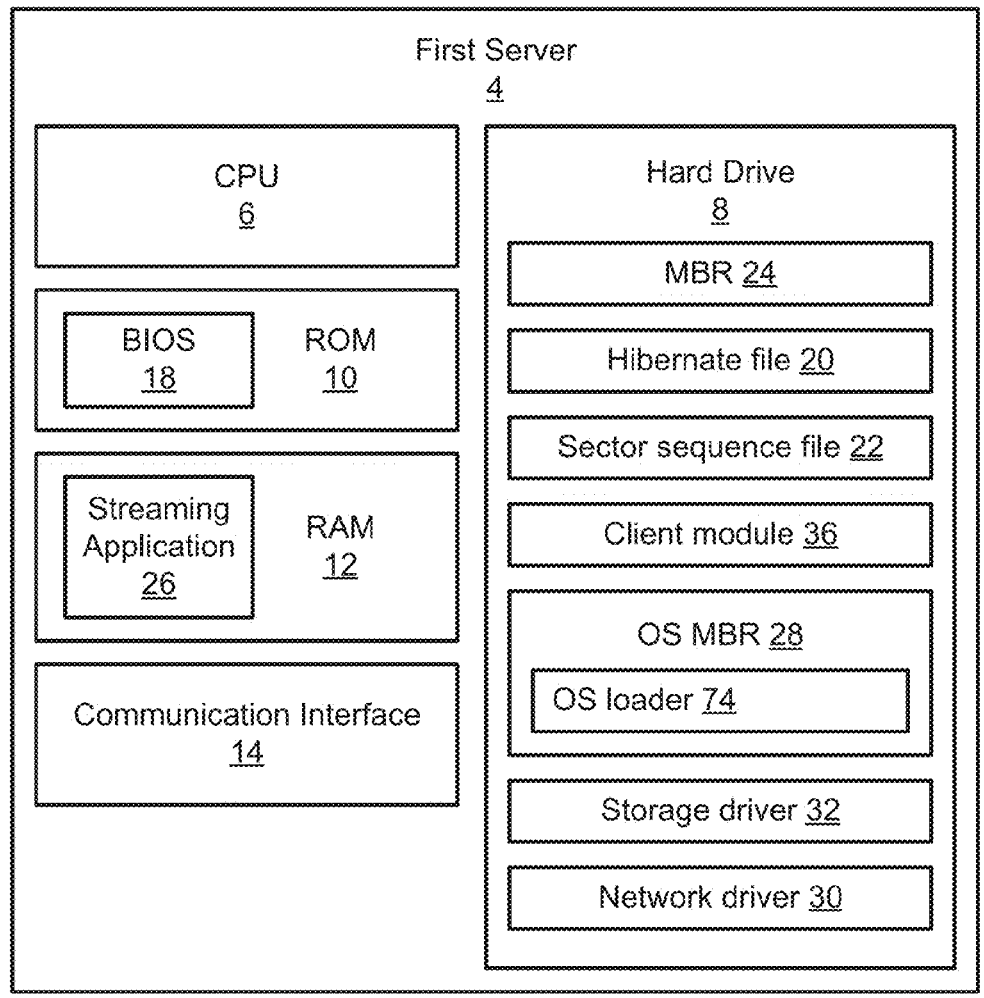
Figure 4C:
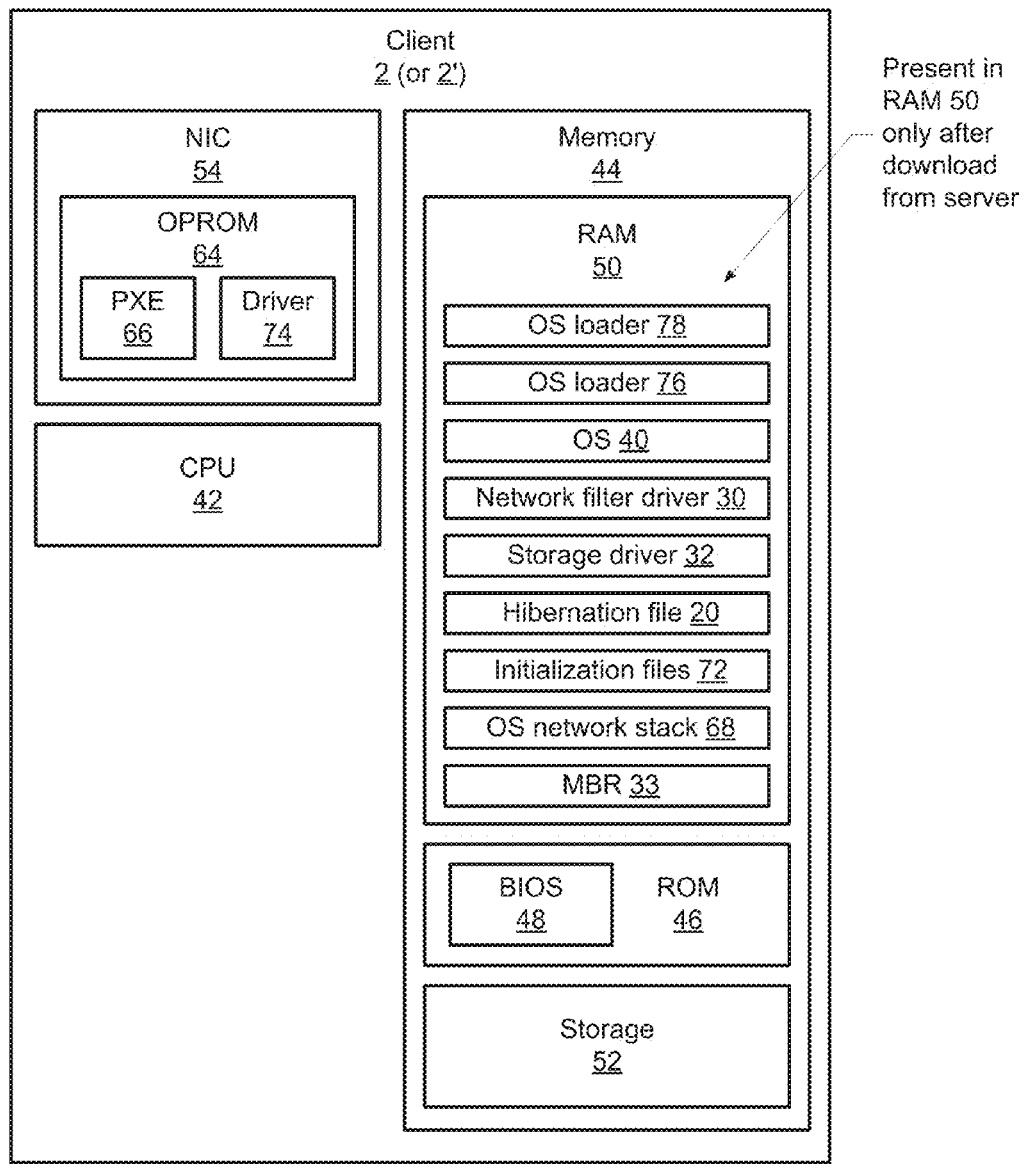

The networked computing environment shown in FIGS. 4A-4C may be an enterprise network or client/server configuration, in which any one of the PC's 2 may function as a file server or network server 4. Network server 4 may be any ordinary type of system, from a relatively small PC to a large mainframe. The one or more client devices 2 are coupled to the server 4 through a network router or switch 38 in the network. Physical links may assume any of a number of conventional forms, such as cables, switched telephone lines, wireless devices including those operating in radio and infrared spectra, and many others. The client devices and server transfer data to one another using standard network communications protocols.

As illustrated in FIG. 4B, server 4 is a mid-range computer comprised of one or more central processing units (CPUs) 6, a hard drive 8, read only memory (ROM) 10 with its own BIOS 18, random access memory (RAM) 12, and a network adaptor 14 all coupled together by one or more busses 16. The BIOS 18 may be a set of basic routines that helps to transfer information between elements within the network server. In certain embodiments described below, the network server hard drive 8 stores O/S files, such as O/S loaders (e.g., NTLDR) or utility function files (e.g., WIN32.SYS), one or more hibernation files 20, a sector sequence file 22, as well as numerous sets of microinstruction code, such as a MBR 24, a streaming module 26, and an O/S MBR 28 including at least a network filter driver 30 and a storage driver 32.

Optionally, one or more additional servers 34 may be coupled to the network and may communicate with the first server 4 and client PCs 2. In a multi-server network, a client module 36 (e.g., HPPC) may also reside on the first server 4 and, in response to requests from client devices 2, specify which additional server 34 contains client addressing information and download information.

As illustrated in FIG. 4C, client device 2 (or 2') may include an O/S 40 that manages the physical facilities of each client device 2 after a sufficient number of O/S modules and O/S drivers are activated. Each client device is similarly equipped with a CPU 42, such as the x86 family of microprocessors manufactured by Intel Corporation. Each client also includes local memory 44 including ROM 46 storing a BIOS 48, and RAM 50, local storage 52, and a network adapter 54 which are coupled to the CPU by a system bus 56.

FIG. 4C also illustrates a portion of the client's RAM 50 after a sufficient number of sectors have been downloaded and the code they comprise executed. As shown, RAM 50 may contain a downloaded O/S 40, O/S drivers 76, O/S loader 78, O/S utility function file (e.g., WIN32.SYS) 72, network filter driver 30, storage driver 32, and O/S network stack 68. In some embodiments, RAM 50 also contains a hibernation file 20.

Figure 5:
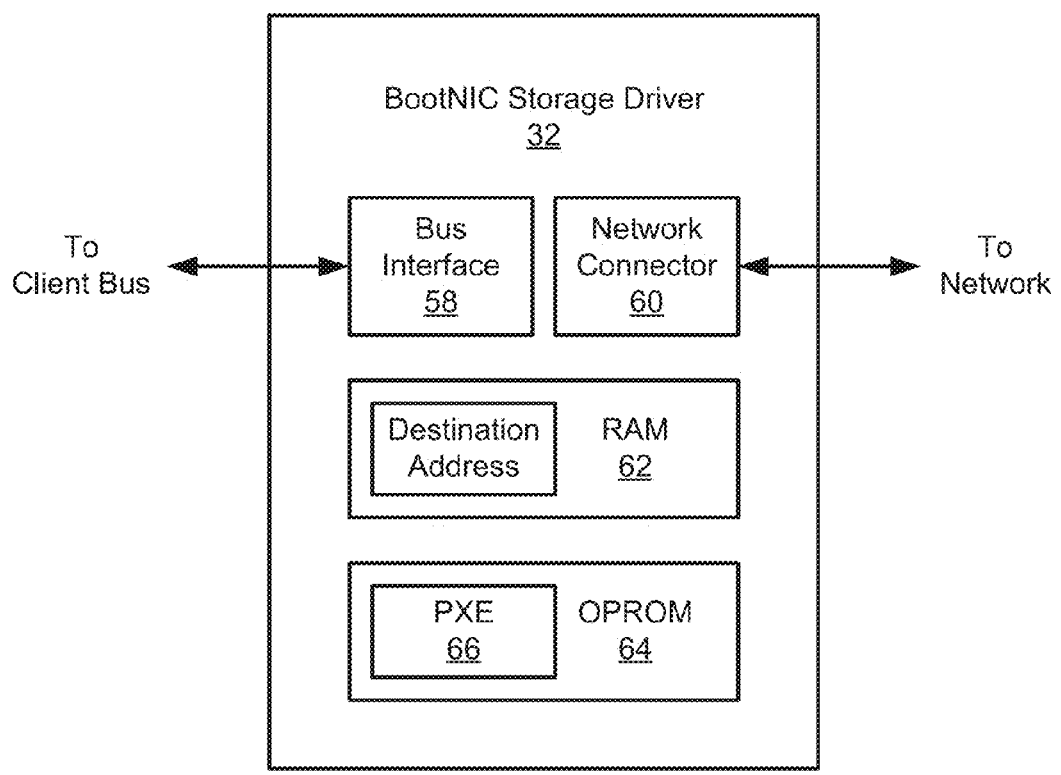
FIG. 5 illustrates a block diagram depicting one embodiment of a network adapter in accordance one embodiment of the present disclosure.

Now referring to FIG. 5, the network adapter 54 of each client is preferably a network interface card (NIC) that provides a data link between the hardware of the client and the network. Each NIC 54 includes a bus interface 58 for connecting to the client system bus 56, and one or more network connectors 60 for connecting to the network, which may comprise a LAN or WAN. Also included on the NIC 54 is random access memory (RAM) 62 for storing the unique destination address of the NIC, as well as an Option ROM (OPROM) 64 storing PXE emulation code 66. The destination address enables each client 2 to be individually addressed by any other computer in the network.

Section B.1: Synchronous Streaming of Desired Data to a Plurality of Clients

As stated, the present disclosure provides a system for and method of streaming data from a network server 4 to one or more clients 2 by transparently emulating a local disk and either broadcasting or multicasting the contents of a set of data sectors residing on the server's "virtual" drive 8 in response to read requests issued by the one or more clients 2. The data may be retrieved in a predetermined manner from a plurality of sectors of a storage device associated with the network server 4. During operation, a set of one or more clients 2 desiring a particular data download issue requests for the download of a plurality of sectors collectively comprising the desired data. Note that different sets of clients may request download of different data. The requests are forwarded to the server, which transparently emulates operation of a local disk at each of the clients. A streaming module 26 resident on the network server 4 broadcasts or multicasts to the set of requesting clients the desired data from the "virtual" storage device. The streaming module 26 preferably accepts the download requests during a predetermined invitation period, prior to transmitting the desired data.

Figure 6A:
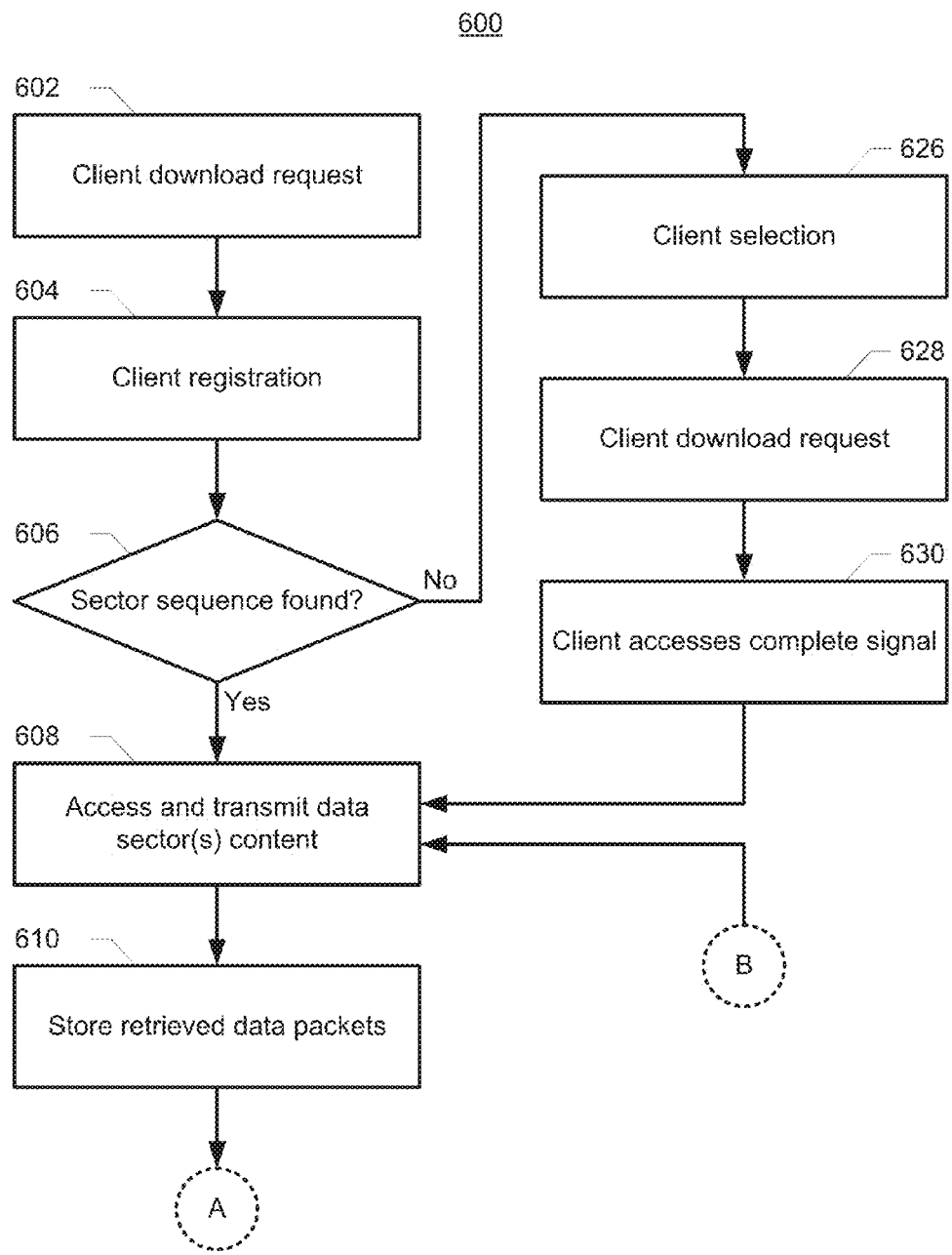
FIGS. 6A-6C illustrate process flows for providing a synchronous streaming process.

FIG. 6 is a flowchart illustrating a process 600 for synchronous data streaming in accordance with the present disclosure. Note that the following description is written in terms of a single set of clients desiring a download of the same data. This is to facilitate understanding and in no way is intended to be limiting. Artisans can readily appreciate that the synchronous streaming method can be expanded to allow different sets of clients to request simultaneous downloads of different data from the network server.

In step 602, each client desiring to download particular data issues an initial request. Desired data may comprise any application files, O/S files, boot programs, or hibernation files residing on the server virtual drive 8. These requests are issued to the server 4, while the server emulates a client's local disk 52, at various stages of boot up, either through the execution of the PXE code 66 and downloaded MBR 33 code, or through execution of O/S MBR 28 code in conjunction with the network filter and storage drivers.

In step 604, the streaming module 26 of the server registers each client 2' issuing an initial request during a predetermined invitation period. Each registered client now waits and listens for data packets from the streaming module 26.

In step 606, the streaming module looks for a sector sequence file 22 on the server 4. The sector sequence file 22 determines the order in which the streaming module may access and either broadcast or multicast data sectors containing the desired data. If a sector sequence file 22 is not found, program flow passes to a learning process for recording a sector sequence file as described below.

In step 608, if a sector sequence file 22 is found, the streaming module 26 will then proceed to broadcast or multicast in burst mode the desired data to the registered clients 2'. Data packets are preferably transmitted at a fixed rate.

In step 610, data packets received by each registered client 2' are stored into fixed-length queues in order to compensate for differences in the transmission rate and client boot process speed. The network and storage drivers will load the received data into a large, temporary section of memory (a "data cache") that they have pre-allocated on each client. Each registered client keeps track of which data packets it has successfully received. This is facilitated by sequentially numbering the transmitted data packets. After step 610, process 600 may proceed to optional step A which is discussed in further detail with reference to FIG. 6B.

Figure 6B:
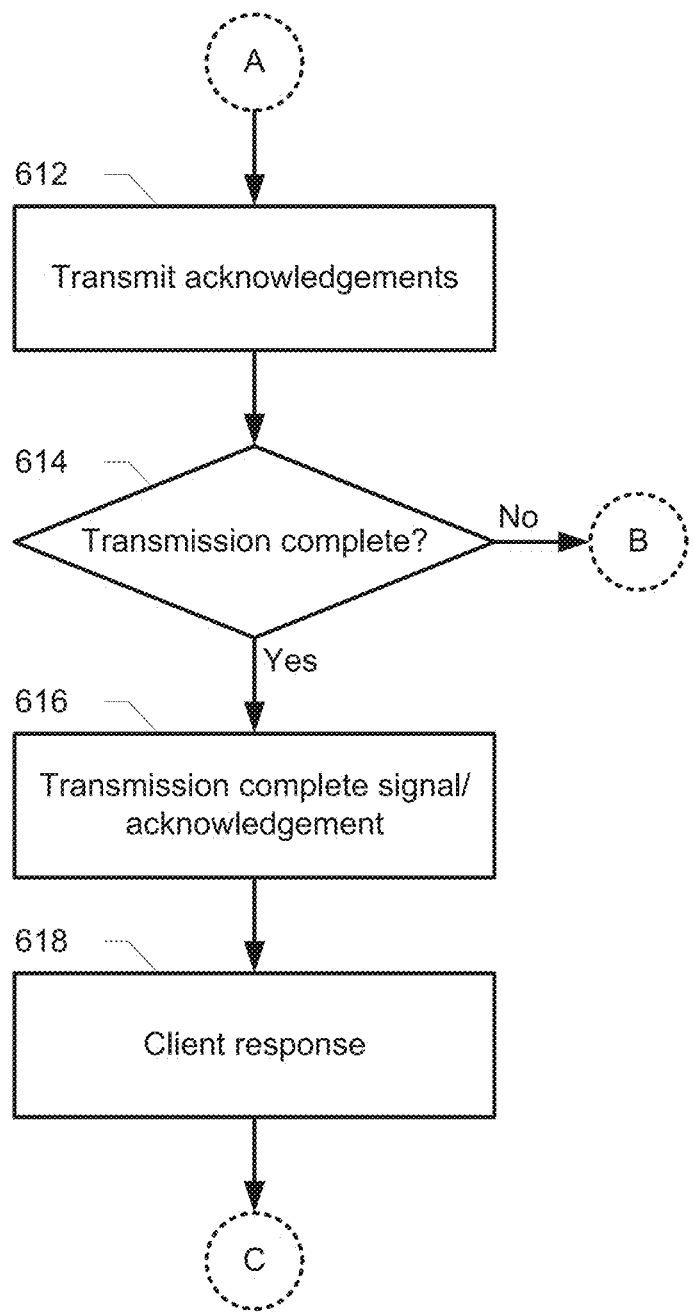

Now referring to FIG. 6B, in step 612, each registered client 2' may transmit to the server an acknowledgement that the most recent N number of packets have been attempted to be successfully received. The goal of the client acknowledgments is to ensure that the local client buffers are not overrun.

In step 614, the streaming module 26 determines if all the desired data sectors have been accessed and their contents transmitted. If not, the process proceeds to optional step B and returns to process 600 of FIG. 6A.

In step 616, if all the desired data has been transmitted, the streaming module transmits a message indicating the transmission is complete. However, at this point, not every client may have received all the blocks of information successfully. Some might have dropped packets due to various reasons. Some may have missed the beginning of the transmission.

In step 618, each of the registered clients 2' will respond to the streaming module 26 with a message indicating successful transmission of all the desired data packets, or the need for retransmission of missing packets. After step 618, the process may proceed to optional step C which is discussed in further detail with reference to FIG. 6C.

Figure 6C:
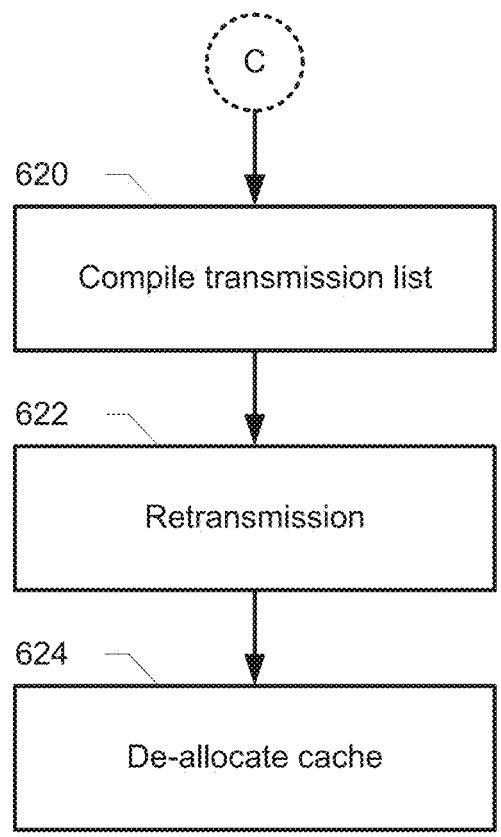

Now referring to FIG. 6C, in step 620, the streaming module 26 may then compile and efficiently order a packet retransmission list based upon the response received from the registered clients 2' indicating a need for unsuccessfully transmitted data packets. Alternatively, the packet retransmission list may be compiled repeatedly after each fixed number of bytes during data packet transmission (prior to step 617).

In step 622, the streaming module 26 then may retransmit the needed data packets on an individual basis to the registered clients 2'. As most clients will be busy processing their received data packets at this time, network bandwidth will be high; therefore individual retransmissions should have no discernible effect on boot time or network traffic.

In step 624, after the downloaded data has been successfully processed, the memory previously reserved for the cache is de-allocated.

As mentioned above, an advantage of the streaming process 600 is that, at each client, while that client's O/S may be occupied with initializing O/S data structures, drivers, or applications, future data needs of the O/S will already have been met by preloading the data packets into memory before the O/S has the need for the data. The streaming module 26 broadcasts or multicasts packets to the clients faster than the clients can utilize them, shifting the dependency of boot up time from the data packet transfer time to the client boot process time.

In certain embodiments, the streaming module 26 employs the sector sequence file 22 in determining the order of virtual drive sector contents to be transmitted. It is expected that the sector sequence file 22 will have been stored on the server 4 prior to initiating the synchronous streaming process, but if this has not occurred, the sector sequence file 22 may be generated during the learning process (e.g., steps 626, 628 and 630) described below.

The learning process is executed if the streaming module 26 cannot find the sector sequence file 22. In one embodiment, the sector sequence file is comprised of a list of sectors that the O/S must read in order to complete the transmission of the disk image transmission. In another embodiment, the sector sequence file comprises not only the list of sectors but also the sequentially stored actual data contained in the listed sectors. In yet another embodiment, the sector sequence file comprises a single file including a plurality of sector lists and corresponding sector data, such that the simultaneous streaming of different data sets to different sets of requesting clients may be supported. A benefit of storing the actual data is that reading a sequential file is much faster than random reads, and it will in turn increase the server's drive throughput and the ability to more efficiently support multiple streams to multiple clients. One result is that the learned actual data can be read exclusively from the sector sequence file until all of the learned data has been transferred to the client. After that point, the server can revert back to using the virtual drive image. In step 626, the streaming module 26 selects one client from the set of registered clients 2'. In step 628, the selected client is permitted to make its disk access requests conventionally, while the streaming module records in a new sector sequence file all sector access requests the selected client makes to fulfill its desired data download, and, in certain embodiments, the requested data itself. In step 630, the selected client informs the streaming module 26 that it has completed its download. At this point, the new sector sequence file is stored on the virtual drive 8, and the streaming process is resumed at step 608. Described below is a use of the streaming process in network booting applications. If the learning process is required to create a sector sequence file 22 in the context of network booting, the selected client is permitted to boot conventionally, using the MBR 24 and drivers 30 and 32, while the streaming module 26 records in a new sector sequence file all sector access requests the selected client makes while booting, and, in some embodiments, the actual data requested.

Section B.2: BootNIC Basic Architecture

The present disclosure provides a system for and method of synchronously streaming data, required for client computers to boot quickly, and accessed from data sectors stored on the network server's "virtual" drive. In certain embodiments, the data sectors the client computers wish to download collectively comprise boot programs and O/S files needed to boot. In certain other embodiments, the data sectors may additionally include one or more hibernation files. Each client desiring to download particular data issues an initial request. These requests are issued to the server 4, while the server emulates a client's local disk 52, at various stages of boot up, either through the execution of the PXE code 66 and downloaded MBR 33 code, or through execution of O/S MBR 28 code in conjunction with the network filter and storage drivers. Stated another way, in the context of a complete network boot of an O/S on a client, the synchronous streaming process 600 is basically duplicated (with some significant differences) before and after the O/S drivers are initialized. This occurs because the O/S boot process uses interrupt handler processes to download files from the virtual drive 8 during the early portion of the boot process, but later uses the storage driver 32 and network filter driver 30 after they are initialized. This necessitated the need for two solutions to perform essentially similar tasks.

As each client boots, it will initially communicate with the server 4 using PXE service. PXE code 66 will establish an initial emulated "virtual drive" connection between each client and the server. PXE services allow MBR code 33 to pass read requests to the server, thereby allowing boot files or hibernation files 20 residing on the server to be seen by each client's CPU 42 as a plurality of data sectors which could be stored on a local client hard drive 52. During the early stages of the bootstrapping, emulation is provided by real mode execution of the MBR code 33, since the BIOS interrupt handler services operate only in real mode. Later in the process, emulation is provided by the O/S kernel code and the storage driver 32 and network filter driver 30 which execute only in protected mode (no "thunking" occurs).

Figure 7:
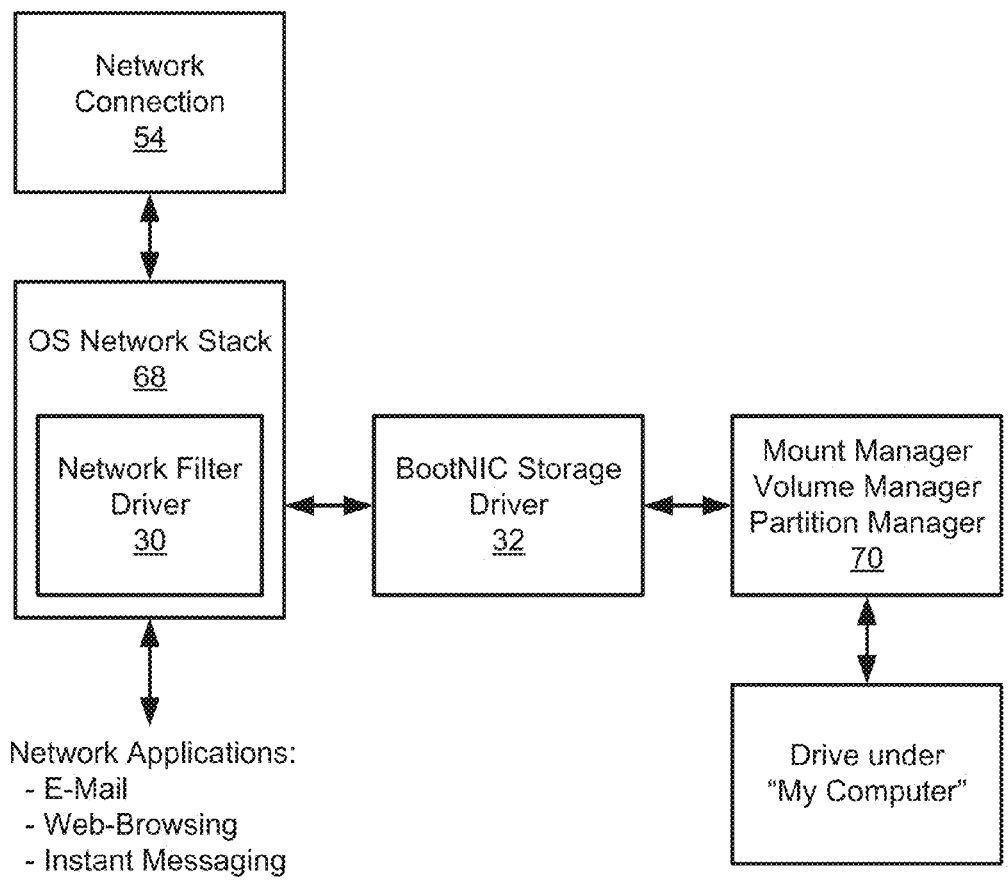
FIG. 7 illustrates a block diagram depicting an embodiment of a portion of a client's local memory after the drivers have been downloaded from a network server and executed.

FIG. 7 illustrates in block form a portion of a client's local memory 44 after the network filter driver 30 and storage driver 32 have been downloaded from the network server 4 and executed. The sole responsibility of the network filter driver is to view all data packets being passed from the network through the client NIC 54 to the O/S network stack 68 for those packets that are BootNIC specific, and intercepts said specific data packets from being passed further down the network stack 68 and instead passes these packets to the storage driver 32. The storage driver 32 will in turn communicate with Windows' various Managers 70 responsible for storage, such as the Mount Manager, the Volume Manager, and the Partition Manager. If a network data packet is not BootNIC specific, then the data packet is passed down the O/S network stack 68 untouched. Those skilled in the art will appreciate that there are three different types of data packets: (1) broadcast packets, which are packets that are addressed to every computer in the network; (2) multicast packets, which are packets that are addressed to more than one, but not necessarily all, of the computers in the network; and (3) directly addressed packets, which are packets that are addressed to a specific client device only. A system according to the present disclosure may employ any or all of these data packet transmission approaches.

The present disclosure may use the specification known as Pre-boot eXecution Environment (PXE), which in some instances is a predictable, interoperable way for clients to interact with a network in a pre-boot environment (with or without an operating system). The current version of PXE was established as a subset of the Intel.RTM.-driven industry initiatives of Wired for Management (WfM). PXE embodies three technologies that establish a common and consistent set of pre-boot services with boot firmware of Intel.RTM. Architecture-based systems: (i) a uniform protocol for clients 2 to request the allocation of a network IP address, and subsequently request the downloading of network bootstrap programs (MBR 24 and O/S MBR 28) from a network boot server 4; (ii) a set of APIs available in the pre-boot firmware environment of the client 2 that constitute a consistent set of services that can be employed by the BIOS 48 or bootstrap programs; and a standard method of initiating the pre-boot firmware to execute the PXE protocol on a client PC.

The use of the PXE specification allows, among other things, each client's NIC 54 to serve as a boot device. It also allows the BIOS 48 to make direct use of the NIC code stored on the OPROM 64 before and during the POST process. The present disclosure, in certain embodiments, optionally uses the PXE feature of boot server discovery. Using this feature, the booting client 2 can discover an appropriate boot server 4 or 34 from a list of available boot servers provided to the client 2 during the initial phase of the remote boot. Boot server types can be assigned and maintained by an information technology administrator based on the client's system architecture type or each client's unique ID. PXE uses Dynamic Host Configuration Protocol and Trivial File Transfer Protocol to communicate with the server 4. When a PXE enabled client boots, it obtains an IP address from a DHCP server 4. The client 2 may then discover the DHCP server 4, which provides the client with a list of boot servers. In FIG. 4A, an additional server 34 is shown, which could act in the capacity of a boot server. In order to facilitate explanation, the simultaneous streaming processes are described in the context of a single server 4 network embodiment, and embodiments in which a single set of clients is requesting download of the same data.

Alternatively, BOOTP enabled clients with a static IP address can also be used instead of the DHCP and PXE method, but with the loss of flexibility and ease of configuration.

Section B.3: Streaming Boot From a Network Hibernation Image

As used herein, the term "hibernate" generally indicates that a PC's power is turned off in such a way that the PC is "paused." While the PC is off, power is removed from all or most of its components. And when the PC is turned back on or "resumed", it is returned to normal operation in the same state in which it was turned off. A "hibernate function" is to be invoked just prior to turning off the PC, interrupting all program execution and saving all PC state information to a "hibernate image" in non-volatile storage. A "resume function" executes from volatile memory, implemented by code that is typically executed from the same executable address space that is used by the O/S and/or application programs initiated by the O/S. In particular embodiments of the disclosure described below, a "hibernate file" may also comprise O/S files such as O/S drivers and initialization files which are read into the PC's volatile memory prior to initiating the hibernate function.

The present disclosure, in another aspect, provides an improved system for and method of booting an O/S to one or more clients 2 from a server 4 storing a hibernation image 20 having O/S files for the client PC's. Each client's CPU 42 executes instructions only from addressable memory such as DRAM or some other type of volatile, electronic memory. In order to initialize this addressable memory, a small amount of PXE code 66 is provided in an OPROM 64 on the NIC 54. The PXE code 66 allows a request to be issued, to the network server 4 emulating a client local disk, to read the MBR code 24. The downloaded MBR code 33 enables further disk emulation, and requests an initial portion of the O/S MBR 28, to be transmitted from the server to the client, where it is loaded into DRAM. The O/S MBR 28 is then responsible for downloading and initializing remaining portions of the O/S, which in turn download the hibernation file 20. Here again, it should be noted that in some systems within the scope of the present disclosure, different sets of clients may request downloads of different boot files of hibernation files. In some instances, synchronous streaming may reduce the time required to boot an O/S 40 over a network by over 50%, as opposed to a standard O/S local boot.

The hibernation transaction protocol consists of two halves. The first half comprises generating the hibernation image on the boot drive 8 and the second half is the actual resume from the hibernation image.

Prior to starting the boot up process, the hibernation file 20 residing on the server 4 is generated in a straightforward manner. Once a client PC is configured to a desired state, the hibernate function is employed to create a hibernation image in the hibernation file 20. The hibernation file 20 is then transferred to the server's boot drive 8. Alternatively, the hibernation process could be executed such that the hibernation file is saved directly to the server boot drive 8. Although the hibernate function instructs all drivers to power down, the storage driver 32 only does so at the request of the O/S, after caching WIN32.SYS 72 into local memory 50 and writing the memory contents to the file HIBERFIL.SYS (the file O/S loader checks for validity upon resuming). Another step preferably performed prior to initiating the boot process is storing on the boot drive 8 the MBR 24 emulation code.

The architecture of Windows® requires two drivers, the storage driver 32 and network filter driver 30, in order to communicate with the server rather than only one, because drivers are required to take on a "type" and one driver cannot simultaneously be a storage driver and a network driver. Windows 2000 and XP's implementations of hibernation assume only one O/S driver will be required to communicate with the storage device, and, accordingly, provide no mechanism to allow the hibernation process to support more than one O/S driver. Presently available standard O/S drivers will not work because they have not been written to resume from a file over a network. In the standard resume from a local drive, an O/S storage driver is only required to (and only does) know how to communicate with the local hard drive.

The storage driver 32 "hooks" into the dispatch routines of the NIC driver 74 by replacing the dispatch address for a power handler in the NIC driver 74 with the storage driver's own handler. The storage driver 32 may then call the original NIC driver power handler routine.

The booting process is comprised of many steps, but generally speaking involves one program starting another, each more intelligent than the one before. The major steps of the present method are the BIOS initialization, PXE initialization, the MBR loading and Int 13h redirection, the loading of the hibernate image, and the O/S resume. Note that this solution is specific to Windows 2000; however, the steps listed below encapsulate a generic framework for extending the solution to other operating systems.

Figure 8:
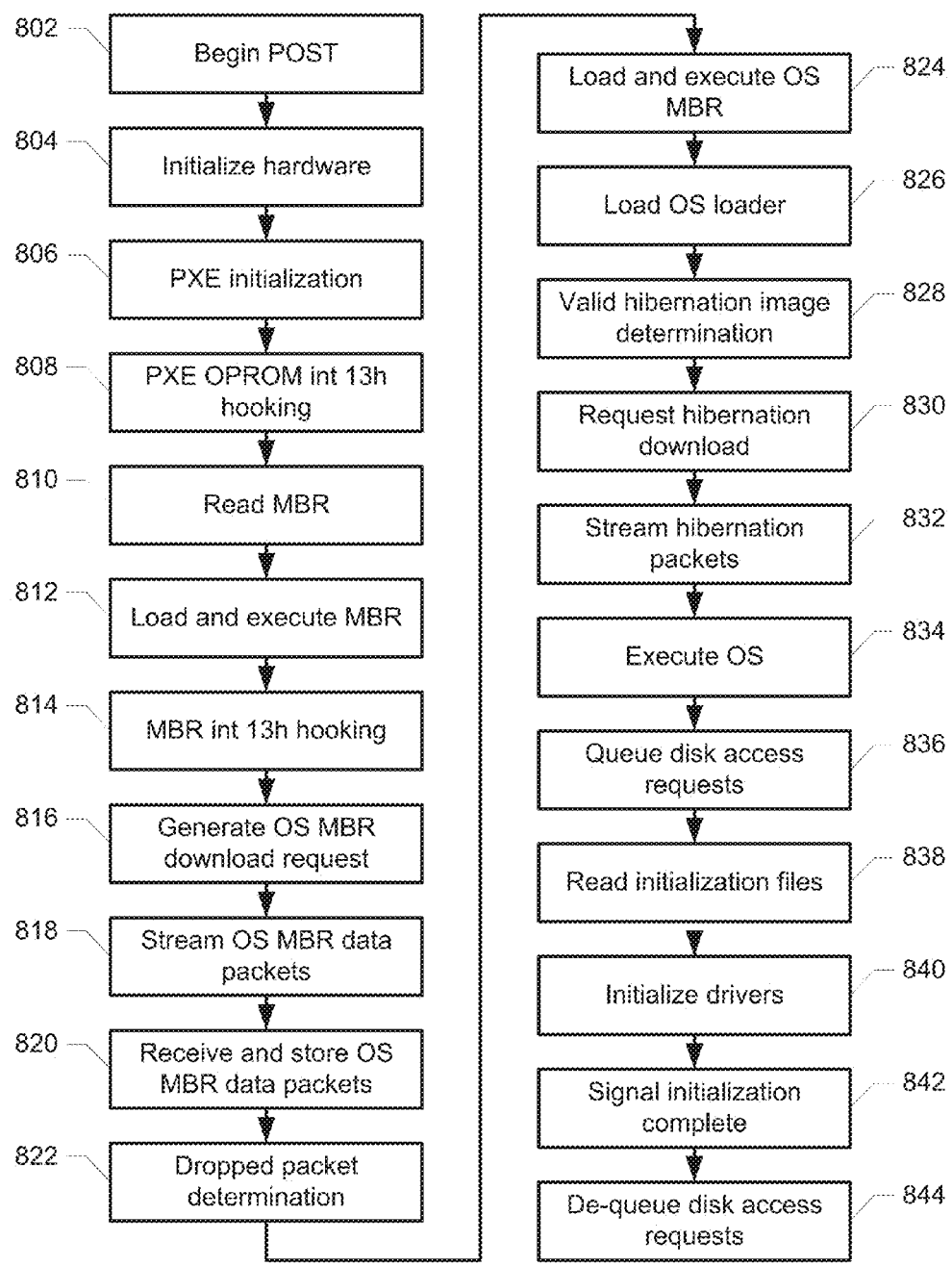
FIG. 8 illustrates a process flow for providing a network booting process employing a hibernation image file.

With reference to FIG. 8, upon powering up, the BIOS 48 initialization of client 2 immediately begins with the execution of a power-on/self-test (POST) sequence (step 802). Each client broadcasts a DHCP discovery request to ascertain its own IP address. The server's O/S, which supports this protocol (and others), returns these parameters as well as the address of a server to boot from, which may or may not be the network server 4. The virtual boot drive 8 may comprise any nonvolatile storage device associated with the network server 4 (or alternative boot server 34). Types of drives could include floppy disks, hard disks, magnetic tape, DVD's, CD-ROMs, and flash ROMs. To be a virtual boot drive 8, a device should hold a copy of a hibernation file containing O/S files, or microinstruction code that is intended to be downloaded.

During the POST, the CPU 42 checks addresses on the bus to determine if an OPROM 64 is present on the client 2. If it finds an OPROM, the CPU processes any hardware initialization routines located on the OPROM, which initializes the NIC 54 (step 804) to a usable state. The OPROM code then initializes the PXE code 66 (step 806). The OPROM code also "hooks" into the BIOS boot process through the interrupt 13h handler services (step 808) which controls reads and writes to the hard drive 52. By using the PXE code and assuming control over the NIC 54, the OPROM 64 code communicates with the server 4 and allows the server's hard drive 8 to transparently emulate a local disk drive 52 of the client 2 through redirection of disk reads and writes to the server.

At the end of the POST sequence, the BIOS 48 will start the booting of the O/S. The BIOS reads the first sector (cylinder 0, head 0, sector 1) of the server's virtual drive 8 (step 810). The first sector stores the MBR 24 (Master Boot Record) that contains additional emulation code to boot the O/S 40. The MBR 24 code is traditionally provided by the O/S manufacturer, but in order to facilitate the hibernation resume process described below, it was necessary to develop additional emulation code. The MBR code is executed after being loaded into client memory (step 812). The MBR code continues to use PXE 66 to communicate with the network server, and hooks interrupt 13h in order to capture all storage access requests, preventing writes to the server's virtual hard disk 8 (step 814) during the early portion of the boot process. Read requests are preferably processed using the synchronous streaming method 400 described above. Read requests are not passed to the original Int 13h BIOS routine, but instead PXE is used by the MBR to receive data from the network server 4. Read requests are satisfied by the MBR code, and requests are then returned to the requestor with the data downloaded from the network server. Disk writes are handled differently. The MBR code does not perform writes, but returns a successful write indication to the disk write requestor. Writes are also not passed to the original Int 13h BIOS routine.

The MBR code then proceeds to download an O/S MBR 28 shown in FIG. 4. O/S MBR 28 may be developed by the O/S manufacturer (e.g., "Windows 2000 MBR"). The MBR code 88 at each client 2, through its hooking of the Int 13h vector, captures all requests for local disk reads before the OPROM 64 has an opportunity to see the requests. The downloaded MBR 88 then forwards, using PXE 66, the requests to the network server (step 816) to download the O/S MBR 28.

In step 818, the network server 4 may synchronously stream data packets that collectively comprise the O/S MBR 28 from the server's virtual drive 8 to each client 2 requesting the O/S MBR download. Streaming module 26 registers for download all clients 2 which make an O/S MBR download request during an invitation period. The invitation period may consist of a predetermined time period that gives all clients an opportunity to register. The streaming module 26 then designates a first client as a Read Requestor. That is, only that client will be allowed to make a read request of the streaming module 26 to transmit to all the registered clients 2' the contents of the next data sector. The streaming module 26 then accesses and simultaneously transmits to each of the registered clients 2' the identity of the Read Requestor and the contents of a first sector of a group of sectors on the virtual drive 8 which collectively store the O/S MBR 28. The streaming module will then determine if all sectors of the O/S MBR group of sectors have been transmitted. If more sectors are required to be transmitted, the streaming module will designate a new Read Requestor client, provided, of course, that there is more than one registered client. Next, the streaming module accesses the next sector and simultaneously transmits its contents with the identity of the new Read Requestor to each of the registered clients 2'. The step of designating a new Read Requestor is preferably performed in a round-robin fashion, whereby one registered client following each sector transmission round will in turn have responsibility for generating a virtual drive read request while the non-designated clients simply wait for transmitted data. This streaming process 600 is repeated until the entire O/S MBR 28 has been transmitted and subsequently loaded at each client, at which time the downloaded O/S MBR takes control of the network interface 54 and request generation process.

Note that each read request, regardless of which registered client it has come from, will be identical. The read requesting effected by the MBR code may, therefore, proceed in a lock-step fashion. Each read request will be identical because each client will be requesting a read from the same virtual drive and executing the same MBR 28 already downloaded from that virtual drive.

In step 820 each registered client 2' has received and stored the transmitted O/S MBR sectors. The received data sectors are stored in RAM 50. Each sector is sent with a sequential number. Each client may then determine (step 822) whether the client successfully received all the sectors that were transmitted. If a client is missing a data packet, the client will then asynchronously request from the network server the missing data sector. This data, though, will only be returned to that individual client and not broadcast or multicast to all the registered clients.

In step 824, the O/S MBR 28 (e.g., Windows 2000 MBR) is loaded into each client's memory 50 and executed. The O/S MBR in turns downloads from the virtual drive an O/S loader 74 (e.g., file NTLDR) (step 826) written by the O/S manufacturer. The downloaded O/S loader 78 will check if a valid hibernation image 20 exists on the virtual drive 8 (step 828). The virtual drive has previously been set up to contain the valid hibernate image 20. The O/S loader 78 then begins to load the hibernate image through a series of Int 13h read requests that the MBR 33 will capture and redirect to the network server 4 (step 830). The streaming process 600 may again be deployed, on this occasion to access and transmit the contents of a plurality of sectors on the virtual drive 8 that collectively store the hibernation file 20 (step 832).

Once the hibernate image has been copied to each client's local memory 44, the O/S loader 78 passes execution to the O/S 40 restored from the hibernation image, i.e., Windows XP or 2000 (step 834). Note that, from this point forward, that read requests are not performed in a synchronous manner. Rather, they are transmitted to and answered by the network server on an individual basis.

The O/S 40 now needs to begin waking drivers 76, such as storage driver 32, and to perform some initialization to bring the system back to a usable state. One difficulty encountered here is that the storage driver 32 must prevent any reads or writes until the NIC driver 74 and network filter driver 30 have been initialized. However, the network filter driver will not be initialized until the O/S 40 has read the file providing system utility functions (e.g., WIN32.SYS). This problem has been solved by the early caching of WIN32.SYS into client memory 50 before creating the hibernation image, thereby making the file a part of the hibernation image itself that has now been read into local memory 50. Thus, the file WIN32K.SYS can be read from local memory without accessing the virtual drive 8. With one exception, the storage driver 32 queues all O/S disk write and read requests into a cache also previously allocated during the creation of the hibernation image, and now in the client system's memory 50. The storage driver 32 simply stores the requests until it is safe to allow the requests to be processed, i.e., after the NIC driver 74 and network filter driver 30 have been initialized (step 836). The file WIN32K.SYS is read from local client memory and the data is returned back to the O/S (step 838).

The O/S 40 then awakens the NIC driver 74 and network filter driver 30 (step 840). In step 842, the network filter driver 30 informs the storage driver 32 that the NIC 54 has been initialized and that the network filter driver 30 is ready to accept the pending read and write requests. Alternatively, the storage driver 32 may have previously (during the creation of the hibernation image) "hooked" into the NIC driver 74 dispatch function, monitoring its data for "IRP_MJ_POWER". This alerts the storage driver 32 when the network drivers have been awakened. Once the O/S 40 transmits IRP_MJ_POWER to the NIC driver 74, the request will always be for full power-on. The storage driver 32 will wait for the NIC driver to finish processing the IRP_MJ_POWER, which then means the network drivers have been fully awakened.

In step 844, the storage driver then de-queues all the cached read and write requests to restore the O/S 40 to a usable state, after which a user may use the client PC in the normal manner. Note that in this embodiment the storage driver handles reads and writes slightly differently. That is, the storage driver caches locally all writes so that the writes are never committed to the virtual driver, in order that different clients do not simultaneously write to the same virtual image and corrupt it. Conversely, reads are actually read from the virtual drive unless a copy of the needed sector has already been cached on the client. In the latter case, the sector is read from the cache in the client's memory and no network transaction takes place.

Other embodiments of the disclosure will be apparent to those skilled in the art from a consideration of the specification or practice of the disclosure disclosed herein. For example, in some embodiments, the synchronous streaming process 600 may be used only in downloading data requested by the interrupt handler processes, or only in the protected-mode accesses of the server. Or the synchronous streaming process 600 may be employed in preloading applications into the clients. Similarly, in other embodiments, booting from a network copy of a hibernation image without the use of the MBR code to synchronize the request and receipt of data packets is within the scope of this disclosure. It is, therefore, intended that the specification and examples be considered as exemplary only, with the true scope and spirit of the disclosure being indicated by the following claims.

Section C: Systems and Methods for Implementing a Provisioned Virtual Machine on a Client In some aspects, the present disclosure relates to systems and methods of implementing a provisioned machine on a client device, where the provisioned machine is able to execute in an offline fashion while being disconnected from a base disk of the provisioning server. The provisioned machine may also operate from a local delta disk that persists on the client machine across the boots of the client system. The systems and methods described herein also relate to persisting a delta disk from which a provisioned machine on the client machine operates across a re-boot of the client machine.

A provisioned machine may involve any number of client devices accessing and using the same base disk of a provisioning server across a network. In order for each of the provisioned machines on the clients to execute, each client machine may include a local delta disk residing on a physical disk used by the provisioned machine. However, in a typical system the client delta disk is normally incapable of persisting across reboot of the client machine. The present disclosure addresses this issue, enabling the delta disk used by the provisioned machine to persist when the client machine is rebooted or restarted.

During a preboot of the client machine, a provisioning bootstrap function for prebooting the provisioning machine may read the virtual hard disk (VHD) format differencing disk as a file located on a file system of the physical disk, such as a file located on a new technology file system (NTFS). The bootstrap function may execute in an operating mode of a CPU, such as for example an x86 real-mode. One or more VHD and NTFS stacks may be implemented with the real-mode environment enabling the client machine control of the prebooting of the provisioned machine as the client machine boots.

During the boot of the client's operating system, such as the Windows OS, a virtual disk storage controller may enable the physical disk controller of the client to initialize the physical disk first so that the delta disk path chain can be established during the boot time. Initializing the physical disk to establish the delta disk path and enable the provisioned operating system to read from or write to the virtual disk that includes the disk delta. As the user on the client utilizes the functions and/or applications of the provisioned machine, the provisioned machine may operate from the virtual disk which may be composed/combined from disk delta and the base disk on the remote server.

Over time, as the delta disks receives the information and data from the server's base disk, the delta disk may include any functions or acquire any functionality of the server's base disk. In the background or by demand, the delta disk may identify portions of the base disk that are present on the server and absent on the client machine and receive such data from the base disk in order to establish the local copy of all the data stored on the server's base disk. The delta file may be synchronized with the base disk on provisioning server over the network via any protocol, such as the PVS built in protocol. The delta file, which may also be referred to as VHD differencing file, may be expanded to the maximum specified size of base disk in order to include additional data from the base disk. The delta file may copy data blocks from base to delta if the data does not exist in delta file. For data blocks that do not exist in base disk, delta file may be zero-filled. Eventually, the delta disk may become an identical copy of the server's base disk or acquire any essential functionality of the server's base disk enabling the delta disk to provide the client's provisioned machine to operate independent from the server's base disk.

When the user shuts down or restarts the client machine, during the OS shut down, the client machine may shut down the virtual disk before shutting down the physical disk. This order may ensure that the delta disk remains stored on the client's physical disk even once the machine is shut down. In some embodiments, an OS of the client machine, such as the Windows 7/Server 2008 R2 OS, comprises the functionality or knowledge to control and manage the interaction and/or dependency between the physical disk and the virtual disk of the client machine. As the provisioned machine may transmit to the client's OS the information about the virtual disk, the OS of the client may use this information to ensure that the virtual disk is stored and shut down properly so that the information from the virtual disk is not lost during the course of shut down or reboot.

Once the disk delta of the provisioned machine is capable to persist across reboot of the client machine, a synchronized virtual disk back-fill may take place to populate, at a storage block level, from the server base disk, blocks of data that are not present in the current VHD differencing disk. Functionality for ensuring that the populated information is not stale may be implemented to ensure that the delta disk is populated with the most updated information of the base disk.

Using the techniques described herein, the present disclosure achieves the persistence of the disk delta of the provisioned machine on the client device as well as the capability to allow such provisioned machine to run in an offline fashion by executing the applications and functions of the provisioned machine from the delta disk that is populated to include all the functionalities of the base disk of the remote provisioning server.

Figure 9A:
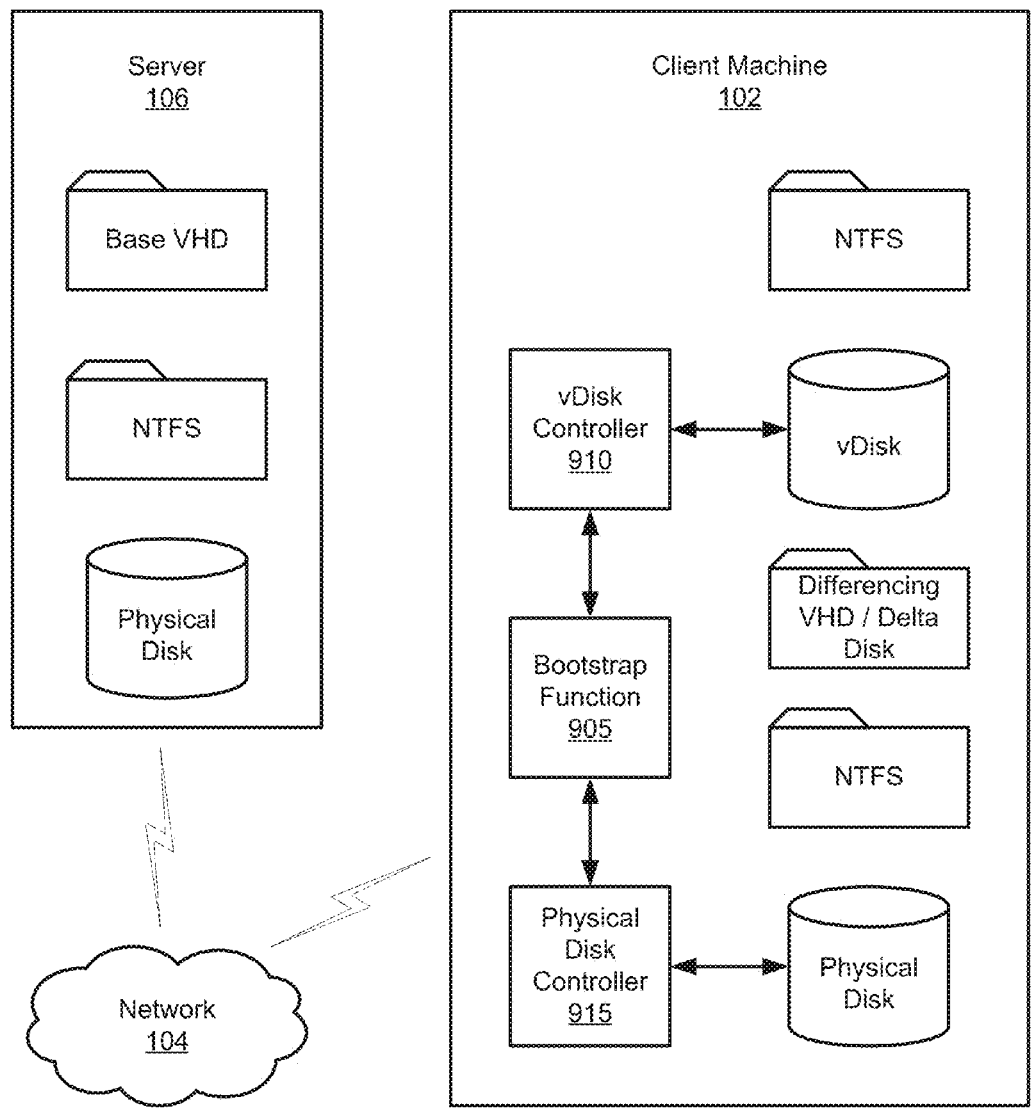
FIG. 9A illustrates a block diagram depicting an embodiment of a system for implementing, on a client, a provisioned machine persistent across the client machine reboot.

Referring now to FIG. 9A, an embodiment of an environment and a system for implementing a provisioned virtual machine on a client device is illustrated. In brief overview, a server 106 communicates with a remote client machine 102 via a network 104, such as an intranet or a World Wide Web. Server 106 may comprise a base virtual hard disk (VHD) for servicing any number of provisioned machines, virtual or physical, of any number of clients 102 on the network 104. Thus, in one embodiment, VHD is streamed to any number of physical machines and any number of virtual machines. The base VHD of the server 106 may comprise information and data used by the provisioned virtual machines of the clients 102 to run applications or functions on, or via, the client's provisioned machine environment. The base VHD may execute on the NTFS file system of the physical disk of the server 106. Client 102 may include a physical disk that stores a differencing VHD, also referred to as a delta disk, which may execute on the NTFS file system of the client's physical disk. The delta disk may include a virtual disk, also referred to as a vDisk, which may also include a NTFS file system of its own. The NTFS of the vDisk from the delta disk may provide the environment within which the user of the client 102 executes the applications and services that may also be provided by the base VHD of the server 106.

The NTFS, or the NTFS layer may comprise any file system or an organized collection of data, data architecture or a database used by any operating system described herein. The NTFS may operate on any network device, including a client 102 or a server 106. The NTFS may comprise or include a functionality of any software, hardware or a combination of software and hardware, programs, executables, functions, instructions, data or libraries. The NTFS may operate on a physical disk or on a virtual disk or a vDisk. The NTFS layer may provide a system of storing data and files on the hard disks or memory of any device described herein. The NTFS may be a hierarchical or a non-hierarchical file system and may be configured to operate on any operating system (OS) referenced herein. In one embodiment, NTFS layer corresponds to the NTFS file system format used by a Windows 7 operating system. In other embodiments, the NTFS may include or comprise the functionality of any other file system for any other OS. The NTFS may be or include the functionality of a file allocation table (FAT) filing system, including the FAT 32 or FAT 64, a Hierarchical File System, any filing system for organizing data for a Mac OS or a Mac OS extended file system. The NTFS may comprise an environment within which applications or services execute or operate. The NTFS may also include any functionality enabling an operating system of a physical machine or a virtual machine, to execute functions or applications used by the user.

A base VHD, or a base disk of the server 106, in addition to any aforementioned base disk of a server, may also include any portion of a physical disk of a server 106 disk from which a base disk image 180 may be made. The base disk of a server 106 may comprise a virtual disk located on the NTFS of the physical disk of a server 106. The base disk may comprise or include a functionality of any software, hardware or a combination of software and hardware, programs, executables, functions, instructions, data or libraries. The base disk may include files, programs, instructions, applications or procedures needed or used to operate any application or a service. The base disk may comprise any functionality to enable the operation of a provisioned machine executing on a client 102. Base disk image 180 may comprise an identical copy of the whole base disk or any portion of the base disk. The base disk may comprise any functionality of a base disk image 180 discussed above. In addition, the base VHD may include a base disk image 180 to be used by any number of clients 102 or any number of base disk images 180 for usage by any number of clients. A base disk VHD may comprise any additional environment, functions or data for implementing any of the functions, services or applications used by the client 102, including the applications, services or functions described herein. A base disk VHD may also include functionality, programs or features for transmitting to a vDisk of a client 102 any data, blocks of data or portions of the base disk in order to populate the vDisk of the client 102 with data or information stored in the base disk.

A differencing VHD, or delta disk of a client 102, may be comprise any type and form of a virtual disk described herein. A delta disk may comprise or include a functionality of any software, hardware or a combination of software and hardware, programs, executables, functions, instructions, data or libraries. A delta disk may comprise a copy of a whole base disk or any portion of a base disk or any portion of a base disk image 180. A delta disk may comprise any type and form of an aforementioned base disk image 202 or any functionality of a base disk image 202. A delta disk may also include any type and form of an aforementioned delta disk 204, an initial virtual disk image 208 a modified disk image 210, a second delta disk 212 and a final disk image 214. A delta disk may be stored in and operate on the NTFS of a physical device of a client 102. The delta disk may be comprise or provide a copy of a virtual disk used by the provisioned machine executing on the client 102.

A bootstrap function 905 may comprise any type and form of a function, program or procedure for controlling or managing a pre-booting process or booting process for starting up the client machine 102. Bootstrap function 905 may also comprise any type and form of a function, program or procedure for controlling or managing the procedure or process of shutting down of the client machine, particularly the order of shutting down the virtual disk and the physical disk. Bootstrap function 905 may comprise any software, hardware or combination of software and hardware, programs, functions, executables, instructions, data or libraries. Bootstrap function 905 may execute on an x86 real mode. Bootstrap function 905 may comprise the functionality for reading the differencing disk or the delta disk as a file located on the NTFS of the physical disk. Bootstrap function 905 may comprise the functionality to initiate or activate the virtual disk from the delta disk. Bootstrap function 905 may include any booting application, boot-up or boot function or procedure described herein. In addition, bootstrap function 905 may comprise a program for activating programs controlling and managing the operation of the client machine 102. Bootstrap function 905 may comprise a program, such as a BIOS, that initializes and tests basic requirements of hardware, memory or other subcomponents and devices of the client 102. Bootstrap function 905 may comprise a functionality for initializing and loading an operating system of a client 102, including the operating system of a physical device and the operating system of a virtual disk of the client 102. Bootstrap function 905 may comprise the functionality for identifying a delta disk on the client 102 during the boot-up of the client 102. Bootstrap function 905 may include the functionality for initializing the delta disk and/or starting up the virtual disk during the boot up of the client 102.

Virtual disk controller 910 may include any type and form of a function or controller for controlling or managing the virtual disk of the client 102. Virtual disk controller 910 may comprise any software, hardware or combination of software and hardware, programs, functions, executables, instructions, data or libraries. Virtual disk controller 910 may include any functionality for starting up the virtual disk or shutting down the virtual disk. Virtual disk controller 910 may start up the vDisk during the boot up of the client 102 and may shut down the vDisk during the shutdown of the client 102. Virtual disk controller 910 may include any functionality for operating responsive to commands or instructions of the bootstrap function 905. For example, virtual disk controller 910 may initiate and set up the vDisk of the delta disk of the client 102 responsive to an instruction from the bootstrap function 905 during the start up or boot up of the client 102. Similarly, virtual disk controller 910 may shut down the virtual disk during the shutdown of the client 102 in response to an instruction from the bootstrap function 905.

Virtual disk controller 910 may also include the functionality for determining data or portions of data that are present at the base disk of the server 106 and not present at the delta disk of the client 102 and acquiring such data from the base disk of the server 106. Virtual disk controller 910 may comprise the functionality to request from the base disk blocks of data not present on the delta disk and populate the delta disk with the data received. Virtual disk controller 910 may comprise the functionality for establishing a background connection with the base disk of the server 106 and keep synchronizing the delta disk with the base disk until the delta disk includes all the data of the base disk of the server 106.

Physical disk controller 915 may include any type and form of a function or controller for controlling or managing the physical disk of the client 102. Physical disk controller 915 may comprise any software, hardware or combination of software and hardware, programs, functions, executables, instructions, data or libraries. Physical disk controller 915 may include any functionality for starting up the physical disk or shutting down the physical disk. Physical disk controller 915 may start up the physical disk during the boot up of the client 102 and may shut down the physical disk during the shutdown of the client 102. Physical disk controller 915 may include any functionality for operating responsive to commands or instructions of the bootstrap function 905. For example, physical disk controller 915 may initiate and set up the physical disk of the client 102 responsive to an instruction from the bootstrap function 905 during the start up or boot up of the client 102. Similarly, physical disk controller 915 may shut down the physical disk during the shutdown of the client 102 in response to an instruction from the bootstrap function 905.

Figure 9B:
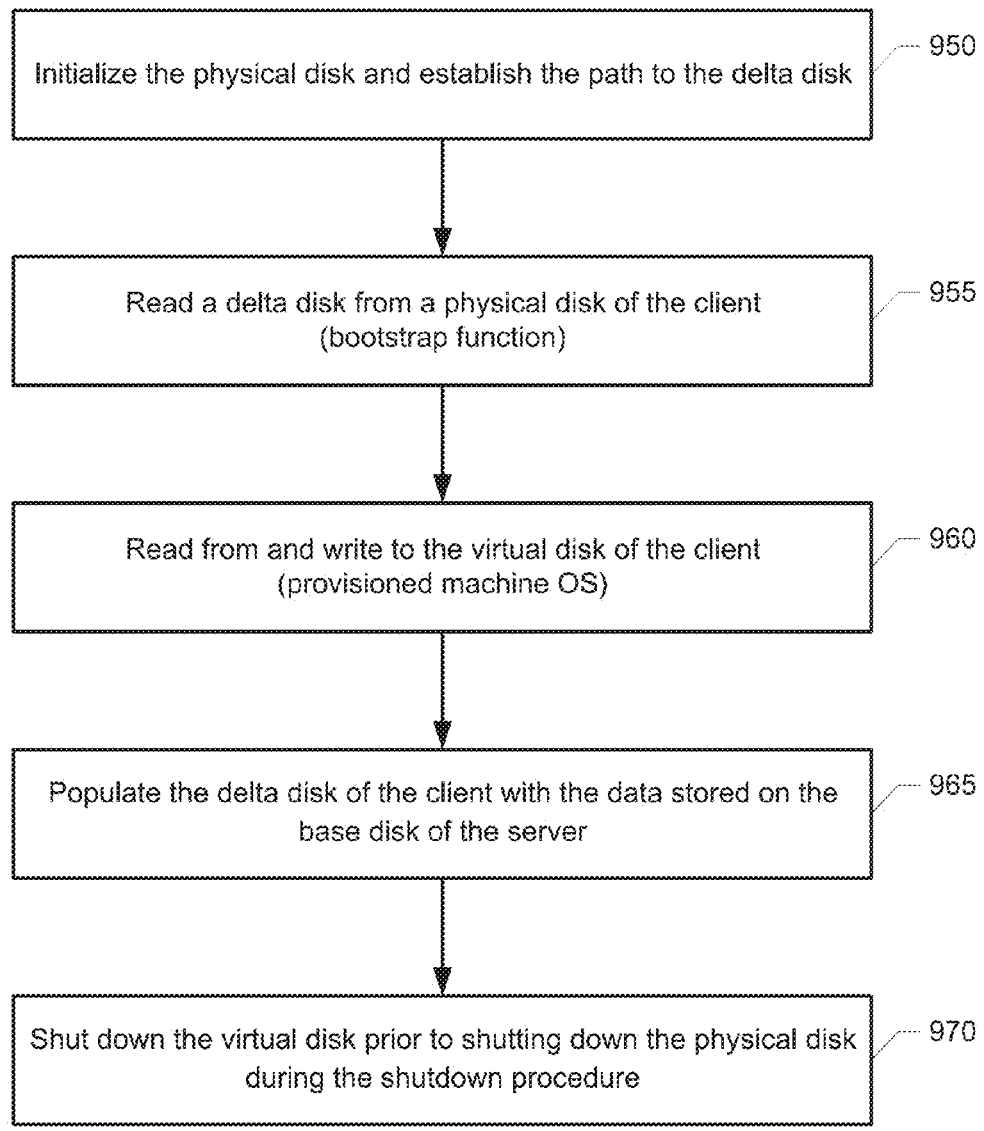
FIG. 9B illustrates a process flow for implementing, on a client, a provisioned machine persistent across the client machine reboot.

Referring now to FIG. 9B, an embodiment of a method for implementing a provisioned machine on a client device is illustrated. In brief overview, at step 950, a bootstrap function initializes a physical disk and establishes the path to a delta disk. At step 955, the bootstrap function reads the delta disk from the physical disk. At step 960, the operating system of the provisioned machine reads from and writes to the virtual disk of the client as the user operates on the provisioned machine. At step 965, the virtual disk controller populates the delta disk of the client with the data stored on the base disk of the server. At step 970, the bootstrap function ensures that during the shutdown of the client machine, the virtual disk is shut down prior to the shutting down of the physical disk.

At step 950, during the boot up of the operating system of the client, the bootstrap function initializes the physical disk and establishes the path to the delta disk. In some embodiments, the initialization of the physical disk and establishment of the path to the delta disk occur before the boot up of the client machine begins, such as in pre boot, for example. In some embodiments, the bootstrap function establishes the path to the virtual disk on the delta disk during the boot up of the client machine. The bootstrap function may pause or delay the start up or boot up of the operating system to ensure that the path chain to the delta disk or the virtual disk is established. The bootstrap function may establish the path to the delta disk by allowing the physical disk to start up in order to read the delta disk from the physical disk. The delta disk created on the client machine prior to the previous shut down of the client may persist responsive to the initialization of the physical disk and establishment of the path to the delta disk during the boot up of the client machine.

At step 955, a bootstrap function identifies, initiates or reads a delta disk from a physical disk of the client machine. The bootstrap function may identify, initiate or read a delta disk from the physical disk during a pre-boot of the client machine. In some embodiments, the bootstrap function identifies, initiates or reads the delta disk during the boot up of the client machine. In further embodiments, the bootstrap function identifies, initiates or reads the delta disk upon initializing the physical disk and establishing the path to the disk at step 950. In some embodiments, the bootstrap function initiates another function or a program to identify, initiate or read the delta disk. The bootstrap function may pause or delay the boot up of the client machine to ensure that the delta disk or the virtual disk is read or identified. The bootstrap function may read the delta disk as a file located on the NTFS file system of the client machine. In some embodiments, the bootstrap function reads the delta disk as a function or an executable program to initiate or execute. Bootstrap function may implement the VHD and NTFS stacks of the virtual disk in the x86 real mode.

At step 960, the provisioned machine operating system reads from and writes to the virtual disk of the client. The operating system of the provisioned machine as well as any other application operating within the provisioned machine or the client may write to the virtual disk. The virtual disk of the delta disk may be written to or modified during the operation of the client machine. While the client machine is powered up, the provisioned machine may execute the functions from or store data to the virtual disk. A user of the client may use the functions or data from the delta disk as well as the data or functions stored on the remote base disk to operate or execute applications, services or processes.

At step 965, the virtual disk controller may populate the delta disk of the client with data or information stored on the base disk of the remote server 106. In some embodiments, the virtual disk controller determines or identifies that a portion of data is present on the base disk of the remote server and not present on the delta disk of the client. The virtual disk may establish a background connection to transfer the identified portion of data onto the delta disk. The virtual disk controller may continue synchronizing or populating the delta disk with data from the base disk until the delta disk includes all the data or information stored on the base disk. The virtual disk controller may expand the delta disk as necessary in order to include all the data of the base disk. In some embodiments, the virtual disk overwrites a portion of the delta disk with zeros or ones. Once a delta disk includes all the data from the base disk or at least a sufficient amount of data from the base disk enabling the user to rely solely on the delta disk, the provisioned machine may operate from the delta disk even if the client is off line. In some embodiments, the client is disconnected from the server hosting the base disk and the client operates the provisioned machine from the virtual disk or the delta disk stored on the physical disk of the client machine.

At step 970, the client machine shuts down the virtual disk prior to shutting down the physical disk during the shutdown of the client machine. In some embodiments, the virtual disk driver of the Windows OS shuts down the virtual disk prior to the shutdown of the physical disk during the shutdown of the client machine. In other embodiments, a function, such as the bootstrap function, shuts down the virtual disk or initiates shutting down of the virtual disk prior to shutting down the physical driver. In some embodiments, the virtual disk driver manages inter-disk dependency relations and initiates a function to shut down the virtual disk prior to shutting down the physical disk. In other embodiments, the client machine, or a function of the client machine such as the virtual disk driver, sends one or more instructions to the virtual disk controller and a physical disk controller to ensure that the virtual disk and/or the delta disk is shut down prior to the shutdown of the physical disk. The virtual disk controller may ensure that the vDisk and the delta disk are properly stored on the physical disk prior to the shutdown.

It is possible to implement the methods and systems described herein or some of their features in hardware, programmable devices, firmware, software or a combination thereof. The methods and systems described herein or parts of the methods and systems described herein may also be embodied in executable instructions stored in a computer-readable storage medium or machine-readable medium such as a magnetic (e.g., hard drive, floppy drive), optical (e.g., compact disk, digital versatile disk, etc.), or semiconductor storage medium (e.g., volatile, non-volatile).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

What is claimed is:

1. A method, comprising:
provisioning, by a physical machine, a first instance of a virtual machine, the first instance of the virtual machine comprising a first modifiable disk, the first modifiable disk being generated based on a base disk remotely located from the physical machine; and
responsive to a reboot of the physical machine:
identifying, by a bootstrap function executing on the physical machine and prior to booting up an operating system of the physical machine, a path to a file locally stored on the physical machine and comprising data indicating one or more differences between the first modifiable disk and the base disk remotely located from the physical machine, the one or more differences corresponding to one or more modifications made to the first modifiable disk via the first instance of the virtual machine; and
provisioning, by the physical machine, a second instance of the virtual machine, the second instance of the virtual machine comprising a second modifiable disk, the second modifiable disk being generated based on the base disk remotely located from the physical machine and the file.

2. The method of claim 1, wherein identifying the path to the file comprises reading a physical disk of the physical machine.

3. The method of claim 1, comprising:
identifying, by a virtual disk controller executing on the physical machine, data present in a different base disk and not present in the file, the different base disk being located on a server remote from the physical machine.

4. The method of claim 3, comprising:
writing, by the virtual disk controller executing on the physical machine, the data present in the different base disk to the second modifiable disk.

5. The method of claim 1, comprising:
operating, by the second instance of the virtual machine, from the second modifiable disk and the base disk.

6. The method of claim 1, comprising:
operating, by the virtual machine and while the physical machine is disconnected from the base disk, from the second modifiable disk.

7. A computing device, comprising:
at least one processor; and
a memory storing instructions that, when executed by the at least one processor, cause the computing device to:
provision a first instance of a virtual machine, the first instance of the virtual machine comprising a first modifiable disk, the first modifiable disk being generated based on a base disk remotely located from the computing device; and
responsive to a reboot of the computing device:
identify, by a bootstrap function executing on the computing device and prior to booting up an operating system of the computing device, a path to a file locally stored on the computing device and comprising data indicating one or more differences between the first modifiable disk and the base disk remotely located from the computing device, the one or more differences corresponding to one or more modifications made to the first modifiable disk via the first instance of the virtual machine; and
provision a second instance of the virtual machine, the second instance of the virtual machine comprising a second modifiable disk, the second modifiable disk being generated based on the base disk remotely located from the computing device and the file.

8. The computing device of claim 7, wherein the instructions, when executed by the at least one processor, cause the computing device to:
read, from a physical disk of the computing device, the file.

9. The computing device of claim 7, wherein the instructions, when executed by the at least one processor, cause the computing device to:
identify data present in a different base disk and not present in the file, the different base disk being located on a server remote from the computing device.

10. The computing device of claim 9, wherein the instructions, when executed by the at least one processor, cause the computing device to:
write the data present in the different base disk to the second modifiable disk.

11. The computing device of claim 7, wherein the instructions, when executed by the at least one processor, cause the computing device to:
operate the second instance of the virtual machine from the second modifiable disk and the base disk.

12. The computing device of claim 7, wherein the instructions, when executed by the at least one processor, cause the computing device to:
operate, while the computing device is disconnected from the base disk, the second instance of the virtual machine from the second modifiable disk.

13. One or more non-transitory computer-readable media having instructions stored thereon that when executed by a computer cause the computer to:
provision a first instance of a virtual machine, the first instance of the virtual machine comprising a first modifiable disk, the first modifiable disk being generated based on a base disk remotely located from the computer; and
responsive to a reboot of the computer:
identify, by a bootstrap function executing on the computer and prior to booting up an operating system of the computer, a path to a file locally stored on the computer and comprising data indicating one or more differences between the first modifiable disk and the base disk remotely located from the computer, the one or more differences corresponding to one or more modifications made to the first modifiable disk via the first instance of the virtual machine; and provision a second instance of the virtual machine, the second instance of the virtual machine comprising a second modifiable disk, the second modifiable disk being generated based on the base disk remotely located from the computer and the file.

14. The one or more non-transitory computer-readable media of claim 13, wherein the second modifiable disk is generated based on a file stored remotely from the computer and comprising data indicating one or more differences between the base disk remotely located from the computer and a different base disk remotely located from the computer.

15. The one or more non-transitory computer-readable media of claim 14, wherein the virtual machine comprises an operating system configured to support at least one application, and wherein the base disk remotely located from the computer comprises a plurality of files associated with the operating system configured to support the at least one application.

16. The one or more non-transitory computer-readable media of claim 15, wherein the different base disk remotely located from the computer comprises a plurality of files associated with a patched version of the operating system configured to support the at least one application.

17. The one or more non-transitory computer-readable media of claim 16, wherein the one or more differences between the base disk remotely located from the computer and the different base disk remotely located from the computer correspond to one or more differences between the plurality of files associated with the operating system configured to support the at least one application and the plurality of files associated with the patched version of the operating system configured to support the at least one application.

* * * * *